US012008026B1

(12) United States Patent
Sanz et al.

(10) Patent No.: US 12,008,026 B1
(45) Date of Patent: Jun. 11, 2024

(54) DETERMINING REPAIR INSTRUCTIONS IN RESPONSE TO NATURAL LANGUAGE QUERIES

(71) Applicant: John Snow Labs, Inc., Lewes, DE (US)

(72) Inventors: Julio Bonis Sanz, Algete (ES); David Talby, Mercer Island, WA (US); Veysel Kocaman, Echt (NL)

(73) Assignee: John Snow Labs, Inc., Lewes, DE (US)

( * ) Notice: Subject to any disclaimer, the term of this patent is extended or adjusted under 35 U.S.C. 154(b) by 377 days.

(21) Appl. No.: 17/583,048

(22) Filed: Jan. 24, 2022

(51) Int. Cl.
*G06F 16/33* (2019.01)
*G06F 16/35* (2019.01)
*G06N 3/045* (2023.01)
*G06N 3/08* (2023.01)

(52) U.S. Cl.
CPC ...... *G06F 16/3344* (2019.01); *G06F 16/3347* (2019.01); *G06F 16/355* (2019.01); *G06N 3/045* (2023.01); *G06N 3/08* (2013.01)

(58) Field of Classification Search
CPC ... G06F 16/355; G06F 16/3344; G06F 16/344
USPC ........................................................ 707/739
See application file for complete search history.

(56) References Cited

U.S. PATENT DOCUMENTS

| | | |
|---|---|---|
| 10,733,566 B1 | 8/2020 | Chan et al. |
| 2018/0060487 A1 | 3/2018 | Barkan et al. |
| 2018/0322958 A1 | 11/2018 | Kalafatis |
| 2020/0134024 A1* | 4/2020 | Banisakher ............. G06F 40/30 |

(Continued)

FOREIGN PATENT DOCUMENTS

WO  2015031449 A1  3/2015

OTHER PUBLICATIONS

Emre Varol, "Creating Clinical Knowledge Graph by Spark NLP & Neo4j", dated Sep. 21, 2021, retrieved on Mar. 11, 2022 from medium.com/spark-nlp/creating-knowledge-graph-by-spark-nlp-neo4j-9d18706aa08b, 16 pages.

(Continued)

*Primary Examiner* — Hosain T Alam
*Assistant Examiner* — Tracy M McGhee
(74) *Attorney, Agent, or Firm* — VLP Law Group LLP; James A. D. White

(57) ABSTRACT

Techniques are described for performing automated operations related to identifying and using repair and maintenance information, such as summarizing and encoding such information for a number of problems, identifying specific repair or maintenance instructions in response to natural language queries, and using the identified instructions in further automated manners in some situations (e.g., to automatically initiate repair or maintenance actions on a particular target computing device). Identifying of specific instructions in response to a particular natural language query may include initially identifying a group of candidate groups of content that satisfy a defined similarity threshold to an encoded version of the natural language query, providing and using a trained validation model to evaluate each candidate content group and validate if it includes a responsive answer to the natural language query, and then further analyzing one or more validated candidate content groups to determine the actual responsive answer.

25 Claims, 12 Drawing Sheets

(56) References Cited

U.S. PATENT DOCUMENTS

| | | |
|---|---|---|
| 2020/0226164 A1 | 7/2020 | Eifert et al. |
| 2021/0118536 A1* | 4/2021 | Katouzian .............. G06N 20/20 |
| 2021/0319858 A1 | 10/2021 | Reumann et al. |

OTHER PUBLICATIONS

Veysel Kocaman et al., "Improving Clinical Document Understanding on COVID-19 Research with Spark NLP", dated Dec. 7, 2020, retrieved on Jan. 24, 2022 from https://arxiv.org/abs/2012.04005, 9 pages.

GPT-3, Wikipedia, retrieved on Oct. 16, 2021 from en.wikipedia.org/wiki/GPT-3, 9 pages.

OHDSI OMOP Common Data Model, retrieved on Oct. 14, 2021 from www.ohdsi.org/data-standardization/the-common-data-model/, 2 pages.

Spark NLP, retrieved on Mar. 11, 2022 from nlp.johnsnowlabs.com/, 14 pages.

Federico Fancellu et al., "Neural Networks for Negation Scope Detection", Proceedings of the 54th Annual Meeting of the Association for Computational Linguistics, Aug. 7-12, 2016, 10 pages.

Colin Raffel et al., "Exploring the Limits of Transfer Learning with a Unified Text-to-Text Transformer", dated Jul. 28, 2020 and retrieved on Aug. 19, 2021 from https://arxiv.org/abs/1910.10683, 67 pages.

Julio Bonis, "A cognitive search engine and question answering system using SparkNLP", dated Jul. 19, 2021 and retrieved on Aug. 19, 2021 from https://medium.com/@drbonis/a-cognitive-search-engine-and-question-answering-system-using-sparknlp-and-t5-b3902e517586, 18 pages.

Santhosh Hari, "Locality Sensitive Hashing for Similar Item Search", dated Jul. 5, 2018 and retrieved on Aug. 19, 2021 from https://towardsdatascience.com/locality-sensitive-hashing-for-music-search-f2f1940ace23, 12 pages.

SQUAD2.0—The Stanford Question Answering Dataset, retrieved on Jan. 24, 2022 from https://rajpurkar.github.io/SQuAD-explorer/, 39 pages.

Qiao Jin et al., "PubMedQA: a Dataset for Biomedical Research Question Answering", dated Sep. 13, 2019 and retrieved on Jan. 24, 2022 from https://arxiv.org/abs/1909.06146, 11 pages.

* cited by examiner

*Fig. 2A-1*

Example Target Domain Information

| Doc. ID | Location | Date | Title | Keywords | Summary | Text |
|---|---|---|---|---|---|---|
| 00000001 | www.Computer RepairZZZ... | 10/15/XX | 5 Ways To Fix A Frozen Smartphone... | smartphone, frozen, reset | Describes common ways to reset a frozen smartphone... | Trying to unfreeze a frozen smartphone can be extremely frustrating... |
| 00000002 | www.Computer RepairZZZ... | 10/22/XX | USB Ports: Common Mistakes and how to fix them... | USB port, configuration... | Describes how to use and fix USB ports on various devices. | USB ports on your computing devices are incredibly useful, but can also be hard to use. |
| 00000003 | www.Battery-ShopYYY... | 10/17/XX | Change Your Battery to Improve Device Performance... | battery, laptop, smartphone... | How to replace your device battery to improve operations. | Is your device over a year old and starting to lag? Need to recharge after only a... |

*Fig. 2A-2*

Example Extracted / Encoded Target Domain Content

| Doc. ID | Sentence | Paragraph | Language | Embedding Vector | Bucket | Hash Index |
|---|---|---|---|---|---|---|
| 00000001 | Trying to unfreeze a frozen smartphone can be extremely frustrating. | Trying ... extremely frustrating. However, a few .... | English | [ -0.0795291587710386, -0.0311236531843852, -0.0499954363222992, ... ] | 9 | [0,1,1,1,0] |
| 00000001 | However, a few simple tricks can usually get you up and running quickly. | Trying ... extremely frustrating. However, a few .... This article will describe how ... | English | [ -0.0522391587710386, -0.0263683184835852, -0.0068224436322992, ... ] | 18 | [1,0,0,0,0] |
| 00000002 | USB ports on your computing devices are incredibly useful, but can also be hard to use. | USB ports ... hard to use. Luckily, a few simple tricks will ... | English | [ -0.0691853877610386, -0.0583437184413852, -0.0523444363622992, ... ] | 5 | [0,0,1,1,1] |
| 09999999 | Handling common phone problems is easier than you may think. | ... device problems? Handling common phone problems ... think. First, a lot of problems ... | English | [ -0.0876891347035986, -0.0678734143433352, -0.0436493322292, ... ] | 4 | [1,1,0,0,1] |
| 10000001 | ¿Necesitas despegar tu teléfono inteligente? | ¿Necesitas despegar tu teléfono inteligente? No hay problema, le mostraremos como ... | Spanish | [ -0.0576891587034980, -0.0356873144343852, -0.0436493322292, ... ] | 3 | [0,1,0,1,0] |

Example Query

220 ⟩ Query: How do I reboot my frozen <BrandXXX> phone?

Example Encoded Query

| | Query | Language | Embedding Vector | Bucket | Hash Index |
|---|---|---|---|---|---|
| 234a | How do I reboot my frozen <BrandXXX> phone? | English | [-0.079529158710386, -0.033123681843852, -0.049725331222992, ...] | 3 | [0,1,1,0,0] |

Example Top Content Group Candidates With Expanded Contextual Information

| | Doc. ID | Sentence | Paragraph | Language | Embedding Vector | Bucket | Hash Index |
|---|---|---|---|---|---|---|---|
| 244a | 00000001 | Trying to unfreeze a frozen smartphone can be extremely frustrating. | Trying ... extremely frustrating. However, a few ... | English | [-0.079529158710386, -0.033123681843852, -0.049725331222992, ...] | 3 | [0,1,1,1,0] |
| 244b | 10000001 | ¿Necesitas despegar tu teléfono inteligente? | ¿Necesitas despegar tu teléfono inteligente? No hay problema, lo mostraremos cómo ... | Spanish | [-0.025529158703498, -0.035687314833852, -0.024564383222992, ...] | 5 | [0,1,0,1,0] |
| 244c | 10000001 | Handling common phone problems is easier than you may think. | ... device problems? Handling common phone problems ... think. First, a lot of problems ... | English | [-0.087689134702598, -0.087673414433352, -0.024564383222992, ...] | 4 | [1,1,0,0,1] |
| 244d | 00000001 | However, a few sample tricks can usually get you up and running quickly. | Trying ... extremely frustrating. However, a few ... This article will describe how ... | English | [-0.052239158771086, -0.026365381843852, -0.068225346332992, ...] | 18 | [1,0,0,0,0] |

Fig. 2B

Example Validated Answer Subset Of Content Group Candidates With Expanded Contextual Information

| Doc. ID | Sentence | Paragraph | Language | Embedding Vector | Bucket | Hash Index |
|---|---|---|---|---|---|---|
| 00000001 | Trying to unfreeze a frozen smartphone can be extremely frustrating | Trying ... extremely frustrating. However, a few ... | English | [-0.07952915877103386, -0.03913693184385, -0.04938254332222992, ...] | 3 | [0,1,1,1,0] |
| 10000001 | ¿Necesitas despegar tu teléfono inteligente? | ¿Necesitas despegar tu teléfono inteligente? No hay problema, te mostraremos cómo. ... | Spanish | [-0.00523915870349856, -0.03668731484335852, -0.02456418322992, ...] | 3 | [1,0,0,0,0] |
| ... |  |  |  |  |  |  |

Example Query Response 1

Query Response: Trying to unfreeze a frozen smartphone can be extremely frustrating. However, a few simple tricks will usually work. First, try restarting the phone (click *here for details of how*). If that doesn't work, next try to remove and reinsert the battery if possible, and then restart the phone (click *here for details of how*). If not successful, try a hard reset (click *here for details of how*). Next, if not successful, ...

Example Query Response 2

Query Response: To perform an automated repair of your frozen smartphone, connect it to a separate computing system (e.g., laptop, tablet, desktop, etc.) via a USB cord, and then click *here* on your computing system (or input the URL below on your computing system) to initiate an automated repair of your frozen smartphone (including to potentially update settings if incorrect). By proceeding, you agree ...

Fig. 2C

Example Query

280 ⎤ Query: How do I prevent cancer?

Example Query Response

290 ⎤ Query Response: Research has shown that a healthy diet can lower your risk of certain cancers. It also may help prevent other conditions, such as type 2 diabetes, osteoporosis, and heart disease. One benefit of good nutrition is that it helps you maintain a healthy weight. People who are overweight or obese are at risk of more health problems. In general, a high-fiber, low-fat diet and regular exercise can help you lose weight and keep it off. ...

Fig. 2D

DETERMINING REPAIR INSTRUCTIONS IN RESPONSE TO NATURAL LANGUAGE QUERIES

TECHNICAL FIELD

The following disclosure relates generally to automated techniques for identifying specific repair instructions in response to natural language queries, such as for use in automatically determining and implementing repairs to computing devices or other types of repairs.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas. In addition, various other information is available via other communication mediums.

However, existing search engines and other techniques for identifying information of interest suffer from various problems. Non-exclusive examples include a difficulty in identifying and using specific search terms in a useful manner, difficulty in finding answers specific to a particular topic of interest, receiving an overabundance of responses to a query that are too extensive to easily review and with many or most (or sometimes all) being only partially relevant or not relevant to the query (and that thus obscure relevant information if it actually is included in the responses), etc.

BRIEF DESCRIPTION OF THE DRAWINGS

FIG. 2A (including sheets labeled "FIG. 2A-1" and "FIG. 2A-2") and FIGS. 2B-2D illustrate examples of performing described techniques, including automatically determining repair or maintenance instructions for computing devices or other types of repair or maintenance information in response to natural language queries.

DETAILED DESCRIPTION

Figure 1A:
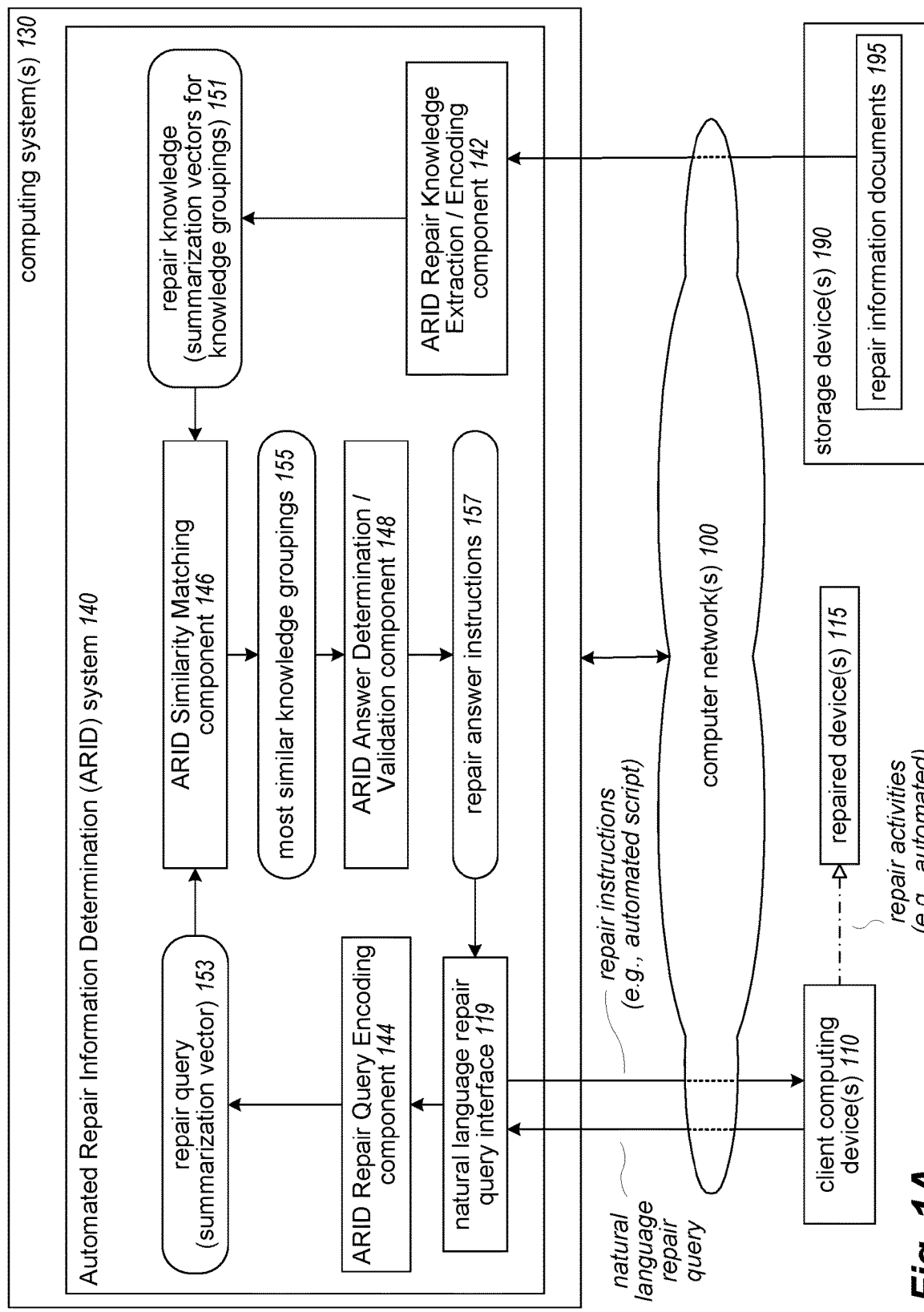
FIGS. 1A and 1B are network diagrams illustrating an example environment and a system for performing described techniques, including automatically determining repair or maintenance instructions for computing devices or other types of repair or maintenance information in response to natural language queries.

The present disclosure describes techniques for using computing devices to perform automated operations related to identifying and using repair and/or maintenance information, such as summarizing and encoding repair and maintenance information for a number of problems (e.g., for one or more types of devices), identifying specific repair or maintenance instructions in response to natural language queries (e.g., for one or more particular such device types that are identified based on those queries, such as multiple device types that are otherwise unrelated), and subsequently using the identified repair or maintenance instructions in one or more further automated manners in some situations. In at least some embodiments, the identified repair or maintenance instructions relate to computing devices (e.g., computer systems, such as desktop computers, laptop computers, tablet computers, server computing systems, etc.; smart phones; etc.), with the identified repair or maintenance instructions being generated in an executable format, and the use of identified repair or maintenance instructions including automatically executing those instructions on a target computing device to be repaired or on an associated computing device in order to automatically implement associated repair or maintenance actions for the target computing device. In addition, in at least some embodiments, identifying of specific repair or maintenance instructions in response to a particular natural language query may include initially identifying multiple candidate groups of content that satisfy a defined similarity threshold to an encoded version of the natural language query, providing and using a trained validation model to evaluate each candidate content group and determine if that candidate content group is validated as including a responsive answer to the natural language query (e.g., without determining the particular answer that is present in a candidate content group validated to include a responsive answer), and then further analyzing one or more validated candidate content groups to determine the actual responsive answer. Furthermore, various additional techniques may be used in some embodiments to improve speed and/or accuracy of determined answers to received natural language queries, including performing automated processing for a corpus of information for a specific problem area/domain that includes using domain-specific information to improve the summarization and encoding of information for that domain (e.g., using domain-specific encoding information and/or labels associated with specific content groups for that domain to customize the encoding of information for that domain). Additional details are included below regarding the automated summarization, identification and use of repair and maintenance information, and some or all of the techniques described herein may, in at least some embodiments, be performed via automated operations of an Automated Repair Information Determination ("ARID") system, as discussed further below.

In at least some embodiments, the described techniques include summarizing and encoding repair and/or maintenance information for a number of problems, and then further using that encoded information to answer queries received in a natural language format. For example, a group of information specific to one or more types of problems (e.g., problems involving repair and/or maintenance of a specific type or class of computing device) may be identified (e.g., identifying a comprehensive corpus of multiple documents related to the one or more problem types), and may be analyzed to separate that group of information into smaller groups of content (e.g., sentences). Each such content group may then be further analyzed, including to encode an embedding vector to represent that content group, and to identify additional expanded content associated with that content group (e.g., some or all of one or more surrounding paragraphs in the same document or other source of the content group, related information from one or more other documents or other sources that are separate from the source document or other source of the content group, etc.). In at least some embodiments, the embedding vector for a content group is generated using a language model that attempts to predict a next word after a current word (or a next sentence after a current sentence), and in such a manner as to represent semantic meaning of the content group (e.g., such that two content groups with similar meanings will have similar embedding vectors)—in addition, in at least some such embodiments, the embedding vectors are generated in a language-independent manner, such that two content groups in different languages but with similar meanings will still have similar embedding vectors. Furthermore, the generated embedding vectors may be further analyzed to group similar embedding vectors in a manner to facilitate later retrieval and use, such as by generating a hash number (or other hash representation) for each embedding vector (e.g., with similar embedding vectors having similar hash numbers), and grouping the same or similar hash numbers into buckets or other groups that are associated with the hash numbers of the embedding vectors in that bucket or other group (e.g., with a single hash number, a range of hash numbers, etc.), so that a particular embedding vector's hash number can serve as an index to select the bucket or other group that includes that embedding vector (and other similar embedding vectors). Such embedding vectors may, for example, be generated as output of a trained neural network, in which a task (e.g., prediction of the next word given a sequence of words, prediction of the next n words given a sequence of words, prediction of surrounding words given a word, prediction of next sentence given a sentence, etc.) is defined and used to train the neural network, and the trained neural network is then used to represent semantic natural language meaning for the information of a content group (or of a query used to identify matching content groups). Additional details are included below related to summarizing and encoding information in various manners, to enable subsequent use of that summarized and encoded information.

As noted above, in at least some embodiments the described techniques further include, as part of determining a responsive answer to a specific natural language query (e.g., provided in free form text), providing and using a trained validation model (e.g., an entailment model) to evaluate each of multiple candidate content groups that are identified as potentially being responsive and to determine if that candidate content group is validated as including a responsive answer to that natural language query (e.g., without determining the particular answer that is present in a candidate content group validated to include a responsive answer). Such a validation entailment model may, for example, be generated using a two-state transfer learning framework where a first language model is trained over unsupervised tasks (e.g., as prediction of a next word, next sentence, etc.), with a second stage (or fine-tuning) involving replacing a top layer of the neural network that sustains the language model by a specific sub-network with interconnected neural network nodes trained to solve the entailment tasks (e.g., trained by providing an annotated corpus of pairs of question/content that are labeled for entailment or not entailment of whether the answer to the question is included in the sentence or paragraph or other content). In addition, once a content group and/or associated expanded information (e.g., a paragraph, a sentence, etc.) is selected for use in providing an answer to a query (e.g., the expanded information for a content group selected as a top validated candidate), the answer may be extracted from that content group and/or associated expanded information in various manners. In at least some embodiments, the described techniques further include performing automated processing for a corpus of information for a specific problem area/domain that includes using domain-specific information to improve operations for that domain (e.g., using domain-specific encoding information and/or labels associated with specific content groups for that domain to customize the encoding of information for that domain). As one example, as part of extracting the answer from a content group and/or associated expanded information, location of the answer to a query within a validated content group's expanded content may be done by transfer learning, such as by using a language model that is pretrained using unsupervised tasks (to capture the general semantic and syntactic information of a language), and is improved by replacing a top layer of that model with a sub-network that is specifically trained to solve the task of finding the answer to a query (e.g., the answer as present in the content, or by generating an answer that is implicitly present in the content), with the resulting network used to generate the answer from the content group and/or associated expanded information.

The described techniques may further be used in various manners to address various types of problems. As noted above, in some embodiments the described techniques include identifying repair or maintenance instructions related to a particular computing device or particular type of computing device, and in some such cases providing the identified instructions in an executable format to initiate one or more automated repair or maintenance actions on that particular computing device or on one or more computing devices of that particular type. In other embodiments, the identified repair or maintenance instructions may be used in other manners, such as to be provided to one or more users (e.g., the user who supplied the corresponding natural language query) for further use (e.g., to display or otherwise present some or all of the identified instructions to the one or more users), such as for situations in which at least some further user activity is involved (e.g., remove the battery from a smart phone, attach a cable to a specified port, etc.). In some embodiments, the identified repair or maintenance instructions may be for types of problems that do not involve computing devices, such as repair or maintenance instructions related to medical problems of one or more types (e.g., to 'repair' a human or other entity having an indicated medical symptom and/or medical condition, such as by a type of treatment specified in corresponding indicated repair or maintenance instructions; to perform maintenance on a human or other entity having an indicated medical symptom and/or medical condition, such as by performing preventive activities to reduce the likelihood of an indicated medical symptom and/or medical condition arising, etc.)—in such embodiments, the repair and maintenance information that is summarized and encoded may include, for example, clinical guidelines from the American Medical Association and/or other types of medical information.

In addition, while various of the discussion herein refers to content groups that are extracted from "documents", it will be appreciated that the described techniques may be used with a wide variety of types of content items and that references herein to a "document" apply generally to any such type of content item unless indicated otherwise (explicitly or based on the context), including, for example, textual documents (e.g., Web pages, word processing documents, slide shows and other presentations, emails and other electronic messages, etc.), visual data (e.g., images, video files, etc.), audio data (e.g., audio files), software code, firmware and other logic, genetic codes that each accompany one or more sequences of genetic information, other biological data, etc. Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information; binary encodings of video information; binary encodings of image information; mathematical equations and mathematical data structures, other types of alphanumeric data structures and/or symbolic data structures; encrypted data, etc.). The group of documents (and/or other content item types) that are used by the ARID system for a particular type of problem and/or particular target area of interest (referred to generally herein at times as a 'domain') may be, for example, a corpus that includes all available documents for a particular domain or that includes sufficient documents to be representative of the domain. In addition, the documents to be analyzed may be obtained from one or more sources, such as from a Web site that includes comprehensive information specific to one or more domains (e.g., a hypothetical "all-PhoneXYZ-now.com" Web site that includes comprehensive information about a particular 'PhoneXYZ' device; the Wikipedia encyclopedia Web site at "wikipedia.org" and Wikipedia Commons media collection Web site at "commons.wikipedia.org" and Wikinews news source Web site at "wikinews.org" that include varied information about a large number of domains; United States Preventive Services Task Force clinical guidelines and/or other sources of medical information for one or more types of medical-related domains; etc.). In some embodiments, each of the documents has contents that are at least partially textual information, while in other embodiments at least some documents or other content items may include other types of content (e.g., images, video information, audio information, etc.).

The described techniques provide various benefits in various embodiments, including to significantly improve the identification and use of responsive information to specified queries, including queries specified in a natural language format, and with such described techniques used in some situations to automatically determine and implement repair and/or maintenance activities on indicated computing devices. Such automated techniques allow such responsive answer information to be generated much more quickly and efficiently than previously existing techniques (e.g., using less storage and/or memory and/or computing cycles) and with greater accuracy, based at least in part on using one or more of the following: the described embedding vectors; the described hash numbers or other hash representations; the described validation model; the described use of domain-specific information to improve and customize the summarization and encoding of information for that domain; etc. Non-exclusive examples of additional related benefits of the described techniques include the following: enabling the processing and use of much larger corpuses and other groups of information; enabling providing a 'no answer' response if a responsive answer to a specified query is not identified (rather than providing a search list of many results that do not include the responsive answer); enabling identifying responsive answers to queries that are more general (e.g., open-ended); etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

For illustrative purposes, some embodiments are described below in which specific types of information are acquired, used and/or presented in specific ways and by using specific types of automated processing—however, it will be understood that the described techniques may be used in other manners in other embodiments, and that the invention is thus not limited to the exemplary details provided. As one non-exclusive example, while specific types of data structures (e.g., embedding vectors, hash representations, buckets of related embedding vectors, one or more trained validation models, labeled content groups specific to a particular problem area or other domain, etc.) are generated and used in specific manners in some embodiments, it will be appreciated that other types of information may be similarly generated and used in other embodiments, including for problem areas other than involving computing devices and/or for types of activities other than repair and maintenance actions, and that responsive answers may be used in other embodiments in manners other than automated repair or maintenance actions, including display or other presentation. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical or related reference numbers may be used in the drawings to identify the same or similar elements or acts.

FIG. 1A is a network diagram illustrating an example environment in which a system for automatically determining repairs for computing devices or other types of repairs in response to natural language queries may be configured and provided. In particular, an embodiment of an ARID system 140 is executing on one or more computing systems 130, and includes several components 142, 144, 146 and 148 that generate and use various information 151, 153, 155 and 157.

In particular, as part of the automated operations of the ARID system 140 in this illustrated example embodiment, the system 140 obtains information from various repair information documents 195 on one or more storage devices 190 about multiple types of repairs in one or more repair domains, such as over the computer network(s) 100. The contents of the repair information documents 195 are received by the ARID Repair Knowledge Extraction/Encoding component 142, which analyzes those contents in order to generate encoded repair knowledge 151, which in this example embodiment includes embedding vectors that summarize the meaning of various identified content groups (e.g., sentences), and additional expanded content for some or all such content groups (e.g., paragraphs). The encoded repair knowledge 151 is then made available to an ARID Similarity Matching component 146 for further use in addressing queries received from users.

In addition, the ARID system operates in an online manner in the illustrated embodiments and provides a graphical user interface (GUI) (not shown) and/or other interfaces 119 to enable one or more remote users (not shown) of client computing devices 110 to interact over one or more intervening computer networks 100 with the ARID system 140 to obtain functionality of the ARID system. In particular, a particular client computing device 110 may interact over the one or more computer networks 100 with the natural language repair query interface 119 in order to submit a query about the type of problem for an indicated computing device or indicated type of computing device (e.g., corresponding to an associated device 115 to be repaired, and/or for the client computing device 110 itself), with the query submitted using a natural language format. The ARID Repair Query Encoding component 144 receives the natural language query, and generates a corresponding encoded repair query 153, which in this example embodiment includes an embedding vector that summarizes the meaning of the query.

The encoded repair query 153 is then made available to the ARID Similarity Matching component 146, which compares the encoded repair query 153 to the encoded repair knowledge 151 in order to determine a group of candidate knowledge groupings 155 that are most similar to the encoded repair query 153—for example, the encoded repair knowledge 151 may include a number of buckets each containing multiple similar embedding vectors for content groups extracted from the repair information documents 195, and the ARID Similarity Matching component 146 may use the embedding vector for the encoded repair query 153 to generate a hash index that identifies one of the buckets, and may select some or all of the embedding vectors in the identified bucket to be candidate embedding vectors (and optionally include one or more additional embedding vectors from one or more other nearby buckets, such as one or more adjacent buckets). The selection of particular candidate embedding vectors may include using a similarity measure or other distance or difference measure to compare the embedding vector for the repair query 153 to at least some of the embedding vectors in the repair knowledge 151, with embedding vectors selected to be the candidate embedding vectors having a similarity measure above a defined threshold (or a distance or other difference measure below a defined threshold). A knowledge grouping may then be determined for each such selected candidate embedding vector, such as to include the corresponding content group and expanded additional content for the selected candidate embedding vector.

The ARID Answer Determination/Validation component 148 then analyzes the most similar knowledge groupings 155 in order to determine corresponding repair answer instructions 157 for the received query, which it then forwards back to the requesting client computing device 110 in response to the received query via the natural language repair query interface 119. The analysis of the most similar knowledge groupings 155 may include, for example, analyzing each of the most similar knowledge groupings 155 to determine if that knowledge grouping includes an answer to the received query (e.g., without actually identifying the answer), and for a subset of one or more of the most similar knowledge groupings that are validated to include such an answer, further analyzing the information of the validated knowledge groupings (e.g., the content group and/or the additional expanded content of each such knowledge grouping) to determine the responsive answer to the query that is used as the repair answer instructions 157. As discussed in greater detail elsewhere, the repair answer instructions 157 may in some embodiments and situations include executable instructions or other information to automatically cause the recipient client computing device 110 and/or an associated computing device to be repaired to execute those repair answer instructions or to otherwise take automated action to perform repair and/or maintenance activities. If no knowledge grouping 155 is validated as including the answer, or if none of the validated knowledge groupings have a responsive answer that may be identified after the further processing, the component 148 may instead supply a response to the requesting client computing device 110 to indicate that no answer is available.

After the requesting client computing device 110 receives the repair answer instructions 157, it may take various actions to use those received repair answer instructions, such as to initiate automated (or other) repair or maintenance activities on itself or on an associated device 115, and/or may display or otherwise present some or all of the received repair answer instructions to one or more users on the client computing device. The interactions of users and/or client computing devices with the ARID system 140 to obtain functionality of the ARID system may involve a variety of interactions over time, including in some cases independent actions of different groups of users and/or client computing devices.

The network 100 may, for example, be a publicly accessible network of linked networks, possibly operated by various distinct parties, such as the Internet, with the ARID system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the ARID system 140 in the illustrated embodiment is implemented in an online manner to support various users over the one or more computer networks 100, in other embodiments a copy of the ARID system 140 may instead be implemented in other manners, such as to support a single user or a group of related users (e.g., a company or other organization, such as if the one or more computer networks 100 are instead an internal computer network of the company or other organization, and with such a copy of the ARID system optionally not being available to other users external to the company or other organizations). In addition, the ARID system 140, each of its components (including components 142, 144, 146 and 148), may include software instructions that execute on one or more computing systems by one or more processors (not shown), such as to configure those processors and computing systems to operate as specialized machines with respect to performing their programmed functionality.

Additional details related to operations of the ARID components 142-148 are discussed below with respect to FIG. 1B and elsewhere herein.

Figure 1B:
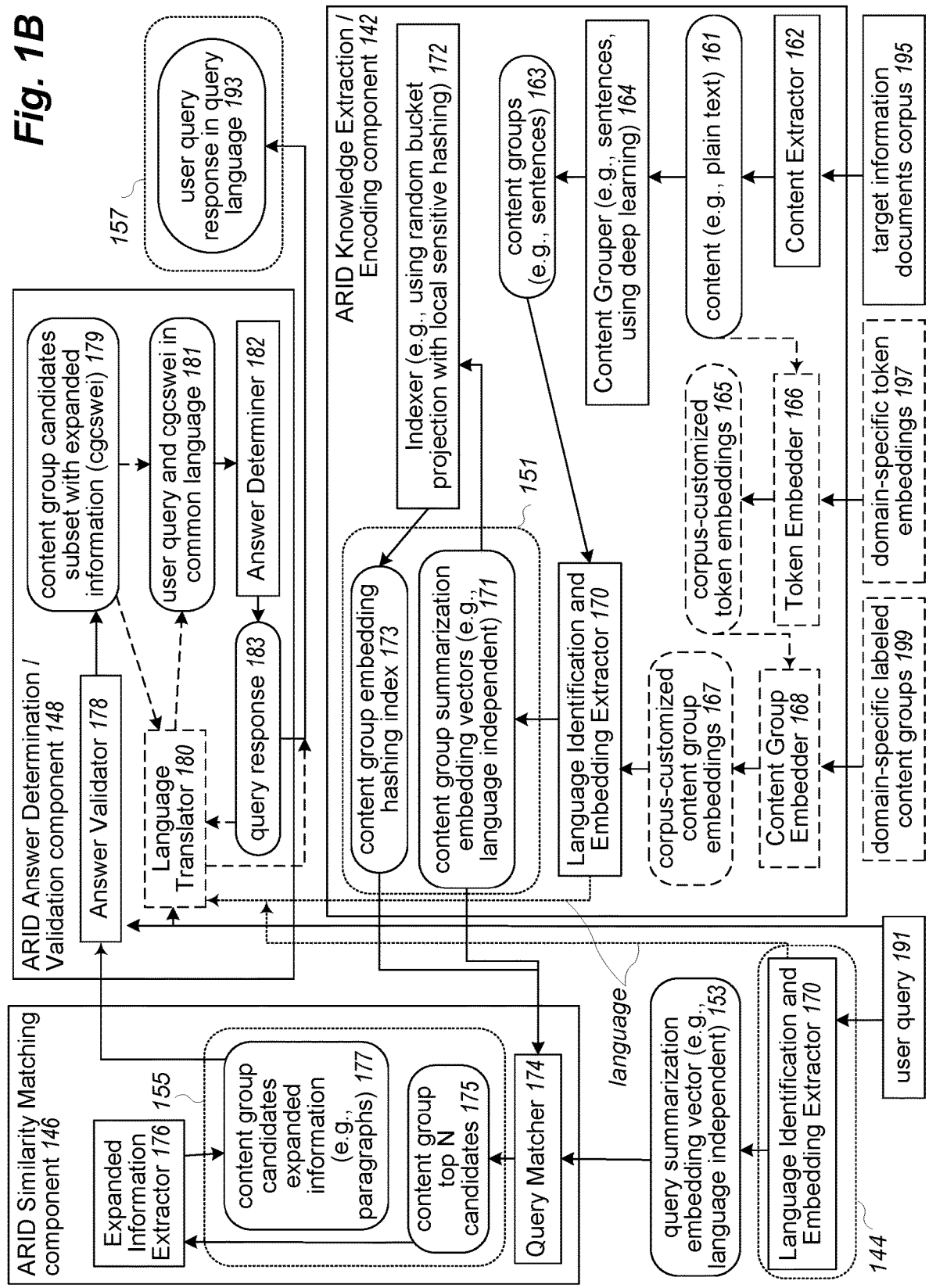

FIG. 1B continues the example of FIG. 1A, and illustrates an example embodiment that includes additional example details about the ARID components 142-148 of FIG. 1A, as well as an embodiment of the ARID system that is capable of providing repair and/or maintenance instructions (or other types of information) for problem areas/domains other than computing devices. In this example embodiment, the ARID Knowledge Extraction/Encoding component 142 receives, from target information documents corpus 195, information about one or more problem areas/domains, and may further optionally obtain and use additional information types 197 and/or 199 as discussed below. The overall goal in this example embodiment is, given a corpus of documents related to a domain (e.g., stored in the form of html, xml, docxs, pptxs, pdfs, images, etc.), to allow a user to make queries in natural language about the domain and obtain an answer based on the content contained in that corpus of documents (e.g., in a real-time or near-real-time manner, such as in a matter of seconds or in less than a second). In this example embodiment, the information from the target information documents corpus 195 is provided to a Content Extractor subcomponent 162 of the component 142, which extracts corresponding content 161 (e.g., in plain text form). In some embodiments, the subcomponent 162 may include optical character recognition (OCR) capabilities to extract text from images or other visual data, as well as different parsers for different supported types of file formats. That resulting content 161 is then provided to a Content Grouper subcomponent 164 of component 142, and in embodiments in which domain-specific token embedding information 197 is available, to an optional Token Embeddor subcomponent 166 along with that embedding information 197. The Content Grouper subcomponent 164 separates the content 161 into content groups 163 (e.g., sentences), such as by using a trained deep learning model (e.g., a deep learning sentence splitter, such as SparkNLP). Each of the content groups 163 is then supplied to a Language Identification and Embedding Extractor subcomponent 170 of component 142, which identifies a corresponding language for the content group and associates the identified language as an attribute of that content group, with such language information subsequently supplied to an optional Language Translator subcomponent 180 for further use in some embodiments.

As previously noted, in some embodiments additional domain-specific token embeddings 197 and domain-specific labeled content groups 199 may be available, and if so may be further analyzed and used to improve the summarization and encoding of content from the target information documents corpus 195. In such situations, domain-specific token embeddings 197 are supplied to the optional Token Embeddor subcomponent 166 of component 142, which analyzes them to generate corpus-customized token embeddings 165—the domain-specific token embeddings 197 may, for example, include pretrained domain-specific token embeddings (e.g., for the problem area/domain of medical information, embeddings trained for a group of English-language biomedical content named bioBERT), and the actions of the Token Embeddor subcomponent 166 may, for example, finetune the content 161 to produce the corpus-customized token embeddings 165, such as with each token embedding 197 being associated with a different embedding vector specific to a meaning of that token (e.g., with the embedding vector in the form of a list of float numbers), and with the corpus-customized token embeddings being such embedding vectors that are further customized for the corpus based on the content 161. The generated corpus-customized token embeddings 165 are then supplied to a Content Group Embeddor subcomponent 168 along with the domain-specific labeled content groups 199 in order to generate corpus-customized content group embeddings 167—the domain-specific labeled content groups 199 may, for example, include sentence-level labeled content relevant to the domain (e.g., medical information from Stanford NLI and MedNLI), and the corpus-customized content group embeddings 167 may each be an embedding vector for a complete sentence that encodes a meaning specific to the corpus (e.g., with the embedding vector in the form of a list of float numbers).

As previously noted, the Language Identification and Embedding Extractor subcomponent 170 receives the content groups 163, and also receives the corpus-customized content group embeddings 167 in embodiments in which they are used. The subcomponent 170 may, for example, include a model that generates a summarization embedding vector 171 for each content group 163 to represent that content group's semantic meaning (e.g., with the embedding vector in the form of a list of float numbers), such as by using the information of the corpus-customized content group embeddings 167 to assist in the generation. An Indexer subcomponent 172 of component 142 may further use the content group summarization embedding vectors 171 to generate a hash number or other hash representation for each embedding vector, and use those hash numbers/representations as an index into groups of related embedding vectors having similar semantic meanings (e.g., using an indexer based on random bucket projection with local sensitive hashing to create a low-dimensional representation of those embeddings). The data 171 and 173 may together, for example, correspond to information 151 of FIG. 1A, and may further be made available to a Query Matcher subcomponent 174 of the ARID Similarity Matching component 146.

When a user query 191 is received (e.g., expressed in natural language form), it is supplied to the Language Identification and Embedding Extractor subcomponent 170 (whether the same subcomponent 170 of component 142, or a different copy of that subcomponent 170), which generates a query summarization embedding vector 153 to represent the query's semantic meaning (e.g., using, for example, an included model, and with the embedding vector being in the form of a list of float numbers)—while not illustrated with respect to the user query 191 for the sake of brevity, the subcomponent 170 that generates the query summarization embedding vector 153 may similarly use the corpus-customized content group embeddings 167 as part of the generation of the embedding vector 153 if the embeddings 167 are available. As with the content groups 163, the subcomponent 170 also determines the language of the user query 191, and makes that information available to the Language Translator subcomponent 180 for later use in some embodiments, such as if the ARID system operates to translate determined responsive answers from one or more other languages to the language in which the user query is received. The Language Identification and Embedding Extractor subcomponent 170 that operates on the user query 191 may, for example, correspond to component 144 of FIG. 1A.

The Query Matcher subcomponent 174 of the ARID Similarity Matching component 146 then operates to compare the query summarization embedding vector 153 to the content group summarization embedding vectors 171 in order to generate candidates 175 of content groups for corresponding candidate embedding vectors that are identified (e.g., a top N number of candidate embedding vectors, with N being customizable or a fixed number, such as in the range of 20 to 50). To identify the candidate embedding vectors, the subcomponent 174 may use the hashing index information 173 to identify the content groups with the most similar meaning, such as in one or more of the hashing buckets. The content group candidates 175 are then supplied to the Expanded Information Extractor subcomponent 176 of the component 146, which generates expanded information 177 for each of the content group candidates, such as to correspond to a paragraph of information related to the sentence for that content group (e.g., a surrounding paragraph in the same document)—the subcomponent 176 may, for example, localize the document, page and position of the sentence for each content group and build one or more paragraphs of content around the sentence with different parametrizations (e.g., window frame size, only-forward, forward backward, section boundaries identification, etc.). A combination of the content group candidates 175 and additional expanded information 177 may, for example, correspond to some or all of the information 155 of FIG. 1A.

The expanded content group candidate information 177 is then provided to the Answer Validator subcomponent 178 of the ARID Answer Determination/Validation component 148, which analyzes the information of the expanded content of a candidate to determine if a responsive answer to the user query 191 is included in that expanded information of that content group, resulting in a group 179 having a subset of one or more of the content group candidates 175 with expanded information 177 that have been validated to include a responsive answer—the subcomponent 178 may, for example, use an entailment resolver (e.g., based on the Google T5, or "Text-To-Text Transfer Transformer", pre-trained language model that is fine-tuned for QNLI, using any massive language model fine-tuned for entailment, etc.), and may result in a limited number of remaining candidate content groups (e.g., ten or less). If the user query 191 and the content group information in the subset 179 are in the same language, or if multilingual functionality is not used in an embodiment, the information 179 may then directly become content 181 in which the user query and the subset of content group candidates are in a common language, with the subset of content group candidates being provided to the Answer Determiner subcomponent 182 of the component 148, which generates a query response 183 in the same language as that of the user query 191 (e.g., using a language model trained to find answers to questions, such as the Google T5 language model), and which is then output as response 193 for the user query 191. Such answers may, for example, include text that is not directly present in a particular content group's expanded content that is used to generate the answer, and in some embodiments and situations may include indications of additional non-textual information (e.g., images, audio, etc.) in a document from which the content group is extracted (e.g., by including links in the provided response to the corresponding parts of that document, by extracting and bodily including that additional non-textual information, etc.). Alternatively, if multilingual support is provided and one or more pieces of information are in different languages, the user query 191 and the subset 179 of expanded information for the content group candidates may be provided to the optional Language Translator subcomponent 180 of the component 148, along with the language information detected for the user query and those content groups, which translates one or more of the pieces of information into a common language (e.g., into the language of the user query), resulting in the information 181 in the common language—the subcomponent 180 may, for example, use a neuro machine translation model to translate the user query and/or to translate some or all of the candidate content groups' expanded information. The user query response in the query language 193 may, for example, correspond to information 157 of FIG. 1A.

While a variety of details have been discussed with respect to the example embodiments of FIGS. 1A-1B, it will be appreciated that other embodiments may not include some such details, and/or may include other functionality that is not illustrated in these examples.

FIGS. 2A-2D illustrate further examples of performing described techniques, including automatically determining repair or maintenance instructions for computing devices or other types of repair or maintenance information in response to natural language queries.

FIG. 2A begins the example by illustrating information 200 and 210 corresponding to example target domain information that is summarized and encoded for subsequent use in responding to user queries for that domain. In particular, information 200 corresponds to example content for a target domain involving repair and/or maintenance of computing devices, such as in a similar manner to the embodiment discussed previously with respect to FIG. 1A. The information 200 is illustrated in the form of a table, with multiple rows 204a-c that each corresponds to a different document in a corpus of information for the target domain, and with illustrated columns 202a-g that include information about each document, such as a unique document ID, a URL or other access location information, a date of access or content creation, a document title, document keywords and summary (if provided), and document textual contents (with only a small amount of the textual contents being illustrated), respectively. It will be appreciated that a variety of other types of information may be available and used in other embodiments, including non-textual content (e.g., images), authors, etc.

In addition, information 210 illustrates examples of summarized and encoded information for the target domain based on the content information 200. The information 210 is illustrated in the form of a table, with multiple rows 214a-e that each corresponds to a content group extracted from the contents of the multiple corpus documents for the target domain, and with multiple columns 212a-g that include various types of information for the content groups, such as a document ID of the document from which the content group was extracted, a textual sentence corresponding to the content group, a textual paragraph corresponding to expanded content information for the content group (e.g. a surrounding paragraph in which the sentence is located, and with only part of the expanded content information shown for the sake of brevity), a determined language for the content group, a generated content summarization embedding vector for the content group, a corresponding bucket in which the embedding vector is placed with other similar content embedding vectors whose associated content groups have similar semantic meanings, and a hash index for the content group's embedding vector that is used to determine the bucket (with example float numbers shown in binary form), respectively. Information 210 further illustrates that the documents of the corpus may include information in different languages, such as with a content group in row 214e that is in the Spanish language while the other illustrated content groups are in the English language, but with their corresponding embedding vectors nonetheless generated in a manner that the content group for row 214e is determined to be similar to the content group in row 214a and are grouped together in bucket 3. It will be appreciated that a variety of other types of information may be available and used in other embodiments, including with respect to non-textual content (e.g., images), to summarizing or grouping content groups and/or their embedding vectors in manners other than hashed buckets, etc.

With respect to the embedding vectors, they may, for example, be a list of float numbers (e.g., encoded in binary) that captures the relationships between linguistic units of meaning (e.g., words, sentences, documents) in a given corpus, and based on the distributional hypothesis (e.g., words/sentences that occur in the same context tend to have similar meanings) is able to capture the semantic meaning of those language units (e.g., words, sentences or even documents). Such embedding vectors may be generated in various manners in various embodiments, such as the following: using a "one-hot encoded vector", where the embedding is composed by a list of n binary numbers of length equal to the total number of different units (typically words) in a given corpus; as output of a trained neural network, in which a dimension of the embedding vector is specified, an embedding is initialized to random values, and a task (e.g., prediction of the next word given a sequence of words, prediction of the next n words given a sequence of words, prediction of surrounding words given a word, prediction of next sentence given a sentence, etc.) is defined and used to train the neural network to form a "Language Model" that can be used to represent natural language meaning in the context of new tasks (e.g., to represent semantic natural language meaning for the information of a content group and/or of a query); etc. In at least some embodiments, new embeddings are not trained, and instead a previously trained language model is reused and applied to a current task (e.g., to represent meaning at the sentence level, such as if the previously trained sentence model was trained to represent sentence meanings, or using different transformations as a token-level embeddings average in order to obtain a sentence-level representation).

With respect to the hash index, it may correspond to a hash table that maps between a symbol (e.g., an embedding vector representation of a sentence) and a value that corresponds to a bucket. A Local Sensitive Hash may be used, via a hashing algorithm where two symbols that are originally close in a vector space of M dimensions will tend to remain close once projected in the hash table with N dimensions (being M>>N). The hashing algorithm may have various forms, such as a Random Bucket Projection (RBP) involving the following steps:
  random creation of k hyperplanes in the vector space of the embeddings;
  for each of the k hyperplanes, use the normal vector of that hyperplane to calculate the dot production with all the embeddings of the corpus (e.g., for every sentence vector representation);
  if the dot product between the random hyperplane and the sentence embeddings is positive, use 1 to represent that sentence in that position, and if not, represent that position as zero—as a result, every sentence in the corpus is represented with a binary vector of k elements (or hashed vector) instead of using the original dimensions used in embeddings, and with each unique hashed vector constituting a different bucket;
  when a new element (e.g., sentence) represented by an embedding arrives, the same set of hashing functions (e.g., hyperplanes' normal vector dot products) may be applied and used to obtain a hash that points to the buckets containing most similar sentences; and
  optionally also compute the closer buckets to a given bucket of interest (to expand the search) by applying quick distances based on binary representations (e.g., as Hamilton distance).

FIG. 2B continues the example of FIG. 2A, and illustrates additional information 220, 230 and 240 corresponding to using the summarized and encoded target domain content of FIG. 2A to respond to a received query. In particular, information 220 illustrates an example query that is received in a natural language format, which in this example is "How do I reboot my frozen<BrandXXX> phone?". Information 230 includes information about encoding of the query into a query embedding vector and associated information, using a table format similar to that of information 210 of FIG. 2A for the target content encoded information, with row 234a corresponding to the query, and with columns 232a-g including information about the query, including the text of the query, a language determined for the query, an embedding vector generated for the query, a hashing bucket to which a hash index generated for the embedding query corresponds, and the hash index information, respectively. It will be appreciated that a variety of other types of information may be available and used in other embodiments.

Information 240 illustrates examples of top content group candidates that are identified as being similar to the query, with the information 240 using a table format similar to that of information 210 of FIG. 2A and with each of the rows 244a-d corresponding to a candidate content group and the columns 242a-g corresponding to information about that candidate content group, in a manner similar to that discussed with respect to information 210. In this example embodiment, the two top candidate content groups are in bucket 3 and are in different languages, while one or more additional candidate content groups may be selected from other buckets (e.g., such as one or more adjacent buckets, and due to having corresponding target content embedding vectors with sufficiently high similarity scores or other sufficiently low distance or difference measures with respect to the generated query embedding vector). The content group corresponding to row 244d may, for example, have a corresponding content embedding vector with some degree of similarity to that of the query embedding vector, but may not be sufficiently similar to be part of the selected group of top candidate content groups.

FIG. 2C continues the examples of FIGS. 2A-2B, and illustrates information 250, 260 and 270 corresponding to further determining a responsive answer to the query 220 by using the information discussed with respect to FIGS. 2A and 2B. In particular, information 250 corresponds to a subset of the candidate content groups that are validated as at least potentially having an answer to the query, with the information 250 shown in a table format in a manner similar to that of information 210, with each row 254a-b corresponding to a validated content group, and the columns 252a-g containing additional information about that of a content group—as discussed in greater detail elsewhere herein, the validation activities may involve using a validation model that is trained for the target domain. Information 260 illustrates an example responsive answer that may be generated for the query 220, such as by extracting corresponding information from the highest matching validated candidate content group's expanded content information, and/or based on further analyzing each of the validated candidate content groups' expanded content information to determine a best answer available from those content groups' expanded content information, although in other embodiments information from multiple validated content groups may be combined as part of generating a responsive answer. In this example, the information 260 includes information to be presented to a user, with embedded links that may be selected by the user to further initiate corresponding repair and/or maintenance activities. Information 270 illustrates an alternative query response to the query 220, which in this example corresponds to providing information that includes executable instructions to automatically perform repair and/or maintenance activities for the indicated type of target device, such as to be executed on an associated computing device that is connected to the target device (or alternatively in some situations to be executed on the target device).

As previously noted, a content group and/or associated expanded information (e.g., a paragraph, a sentence, etc.) may be analyzed to determine if a responsive answer to a query is included, such as using a validation entailment resolver or other validation entailment model. Such a validation entailment model may, for example, be generated using a two-state transfer learning framework where a first massive language model (e.g., the Google T5 language model) is trained over unsupervised tasks (e.g., as prediction of a next word, next sentence, etc.), with a second stage (or fine-tuning) involving replacing a top layer of the neural network that sustains the language model by a specific sub-network with inter-connected neural network nodes trained to solve the entailment tasks (e.g., trained by providing an annotated corpus of pairs of question/content that are labeled for entailment or not entailment of whether the answer to the question is included in the sentence or paragraph or other content).

In addition, once a content group and/or associated expanded information (e.g., a paragraph, a sentence, etc.) is selected for use in providing an answer to a query (e.g., the expanded information for a content group selected as a top validated candidate), the answer may be extracted from that content group and/or associated expanded information in various manners. For example, location of the answer to a query within a validated content group's expanded content may be done by transfer learning, such as by using a massive language model pretrained using unsupervised (non-labeled) tasks (to capture the general semantic and syntactic information of a language, such as the Google T5 language model), and then replacing a top layer of that model by a sub-network that is specifically trained to solve the task of finding the answer to a query, with the resulting network used to generate the answer from the content group and/or associated expanded information. Such a sub-network may be trained, for example, using input that includes triplets each having a query/content/answer. In addition, fine tuning or other improvement of a language model may include using the transfer learning framework to adapt a pre-existing language model to some specific tasks (e.g., entailment or question answering) or to capture domain-specific semantic and/or syntactic relationships. Such entailment and/or query/answer improvement may include, for example, training a neural network architecture with unsupervised tasks (e.g., predicting context given a word, predicting next words, predicting a next sentence, etc.) with domain-specific content (e.g., a target corpus), but instead of starting the values for embedding vectors from random, instead starting from a last state that results from the training of the original general domain language model.

FIG. 2D continues the examples of FIGS. 2A-2C, and illustrates information 280 and 290 corresponding to an alternative query that is received for an alternative target domain, and a corresponding responsive answer that is the determined response to that query, such as may correspond to the embodiment of FIG. 1B or as otherwise discussed herein. In particular, in the embodiment of FIG. 2D, the query 280 is provided in a natural language format and is a general open-ended medical question ("How do I prevent cancer?"), with the query response 290 including information gathered from medical clinical guidelines or other medical information that is part of a corpus of content for the medical domain (e.g., all medical areas, a medical domain corresponding to oncology and/or cancer, etc.), such as for display or other presentation to a user who submitted the query 280. It will be appreciated that questions in a medical domain may be of various types, such as related to a particular diseases or other medical conditions, particular medical symptoms, particular medicines and other treatments and other health-related activities involved in preventative actions or other actions to improve fitness and well-being, particular surgeries and other medical procedures, particular medical devices and other health-related objects used with respect to medical treatments and other health-related activities, particular patients or groups of patients, etc., and that the summarization and encoding of information for a medical domain may include identifying and encoding information about some or all such elements (e.g., diseases or other conditions, symptoms, treatments, medical procedures, medical devices and other health-related objects, patients, etc.). In addition, it will be appreciated that a variety of other types of information may be available and used in other embodiments, including to provide the response 290 in a different format than is shown in this example.

Various details have been provided with respect to FIGS. 2A-2D, but it will be appreciated that the provided details are non-exclusive examples included for illustrative purposes, and other embodiments may be performed in other manners without some or all such details.

Figure 3:
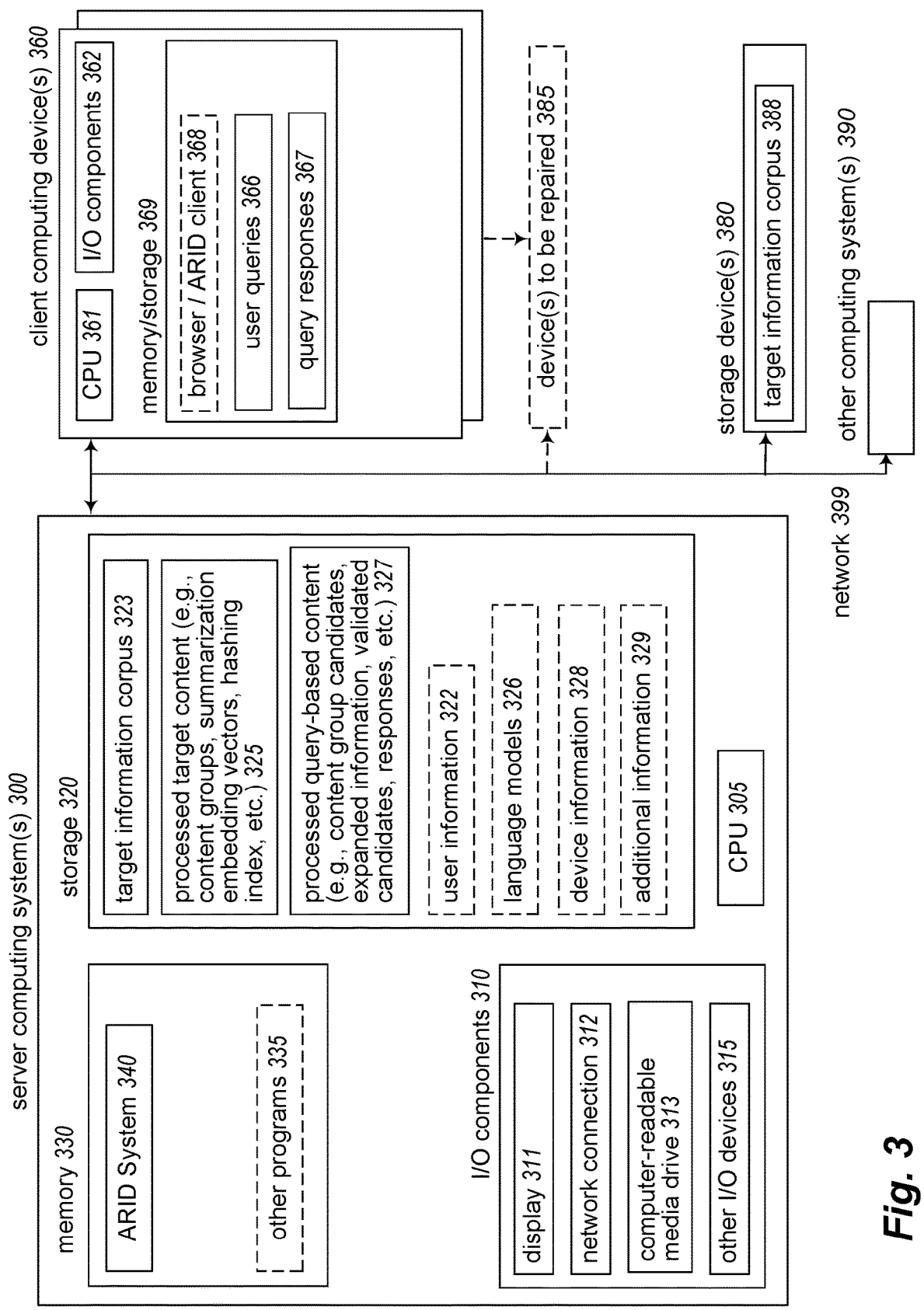
FIG. 3 is a block diagram illustrating an example of a computing system for use in performing described techniques, including automatically determining repair or maintenance instructions for computing devices or other types of repair or maintenance information in response to natural language queries.

FIG. 3 is a block diagram illustrating an embodiment of one or more server computing systems 300 executing an implementation of an ARID system 340—the server computing system(s) and ARID system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated 1/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ARID system 340 may communicate with other computing systems and devices via one or more networks 399 (e.g., the Internet, one or more cellular telephone networks, etc.), such as user client computing devices 360 (e.g., used to supply queries; receive responsive answers; and use the received answer information, such as to implement automated repairs to associated devices 385 and/or to display or otherwise present answer information to users of the client computing devices), optionally one or more devices 385 to be repaired (e.g., if the devices include networking capabilities or other data transmission capabilities), optionally other storage devices 380 (e.g., used to store and provide corpus information for one or more target domains/problem areas), and optionally other computing systems 390.

In the illustrated embodiment, an embodiment of the ARID system 340 executes in memory 330 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the ARID system may include one or more components, not shown, to each perform portions of the functionality of the ARID system, and the memory may further optionally execute one or more other programs 335. The ARID system 340 may further, during its operation, store and/or retrieve various types of data on storage 320 (e.g., in one or more databases or other data structures), such as various types of user information 322, target corpus information 323 (e.g., local copies of some or all of information 388 on remote systems such as storage devices 380; domain-specific information to use in customizing the encoding of content for a domain; etc.), processed target content 325 of one or more types (e.g., content groups and associated enhanced content, summarization embedding vectors, hashing indexes, etc.), processed query-based content 327 (e.g., query summarization embedding vectors, corresponding content group candidates and associated information such as their embedding vectors and/or expanded content, validated candidate subsets, generated responsive answers, etc.), optionally language models 326 to use in generating encoded content, optionally device-specific information 328 (e.g., related to devices to be repaired) or information specific to other entities, and/or various other types of optional additional information 329.

Some or all of the user client computing devices 360 (e.g., mobile devices), devices to be repaired 385, storage devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or ARID client program 368 optionally executing in memory to interact with the ARID system 340 and present or otherwise use query responses 367 that are received from the ARID system for submitted user queries 366. While particular components are not illustrated for the other devices/systems 380 and 385 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ARID system 340 may in some embodiments be distributed in various components, some of the described functionality of the ARID system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ARID system 340 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
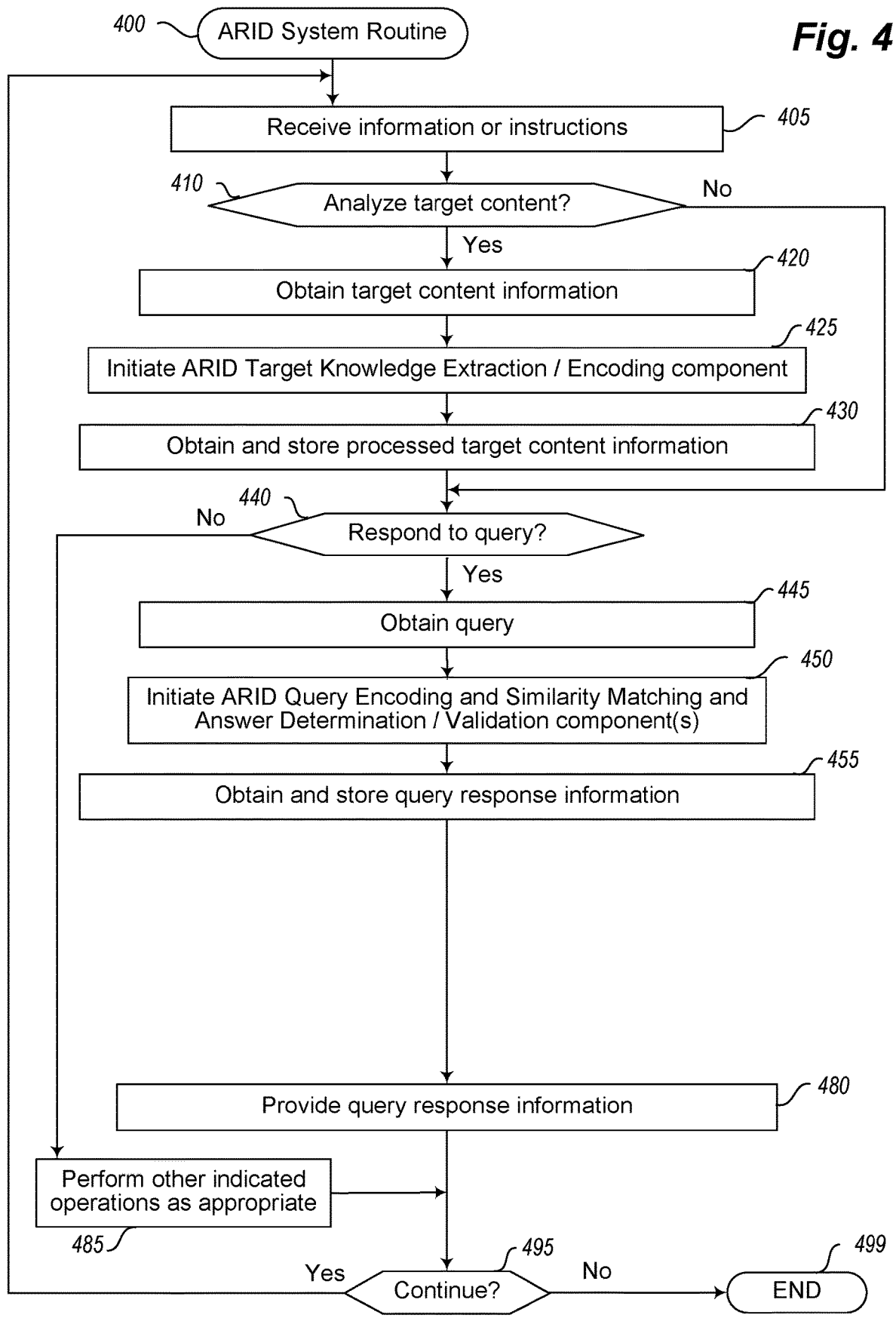
FIG. 4 illustrates a flow diagram of an example embodiment of an Automated Repair Information Determination ("ARID") system routine.

FIG. 4 is a flow diagram of an example embodiment of an ARID system routine 400. The routine may be provided by, for example, execution of the ARID system 140 of FIGS. 1A and 1B, and/or the ARID system 340 of FIG. 3, and/or corresponding functionality discussed with respect to FIGS. 2A-2D and elsewhere herein, such as to automatically determine responses (e.g., repair or maintenance instructions or related information) in response to natural language queries (e.g., with respect to computing devices or other devices, with respect to medical information, etc.). In the illustrated embodiment, the routine analyzes information about one or more domains of interest at various times, such as to pre-process information about a particular domain (e.g., as instructed by a human operator of the ARID system, as requested by a third-party entity, etc.) to determine at least some types of domain-specific information for use in responding to later queries based on such information, while in other embodiments the routine may instead dynamically generate some or all types of domain-specific information in response to requests from users or other entities in at least some situations.

In the illustrated embodiment, the routine 400 begins at block 405, where instructions or other information is received. The routine continues to block 410, where it determines if the instructions or other information received in block 405 are to analyze target content, such as for a target problem area or other target domain, and if so continues to block 420 where it retrieves or otherwise obtains the target content information (e.g., uses information received in block 405) to be analyzed (e.g., multiple documents that are part of a corpus of information for the target domain). In block 425, the routine then initiates execution of an ARID Target Knowledge Extraction/Encoding component routine to summarize and encode information from the target domain (along with an indication of that target domain), such as corresponding to component 142 of FIGS. 1A and 1B, and with one example of a corresponding routine for performing such activities discussed further in FIG. 5. In block 430, the routine then receives the processed target content information from block 425, and stores the information for subsequent use. It will be appreciated that, while the routine indicates proceeding to block 430 immediately after block 425, in other embodiments the routine may operate in an asynchronous manner such that other operations are performed (e.g., corresponding to handling another set of instructions or information that are received in block 405, such as from a different user or other entity) while waiting for a response from block 425, and that the operations of block 425 may be performed in a substantially immediate manner (e.g., less than one second, less than 10 seconds, less than one minute, etc.) in at least some embodiments.

After block 430, or if it is instead determined in block 410 that the information or instructions received in block 405 are not to analyze content for a target problem area or other target domain, the routine continues to block 440, where it determines if the information or instructions received in block 405 are to respond to a received query, and if not continues to block 485. Otherwise, the routine continues to block 445 where it obtains a query in natural language form (e.g., using information received in block 405), and then proceeds to block 450 to initiate execution of ARID Query Encoding and Similarity Matching and Answer Determination/Validation components' routines, such as to correspond to components 144, 146 and 148 of FIGS. 1A and 1B, and with one example of a corresponding routine for performing such activities discussed further in FIG. 6. In block 455, the routine then receives query response information from block 450, and stores the information for later use, with the query response information then provided in block 480 as a response to the received query. It will be appreciated that, while the routine indicates proceeding to block 455 immediately after block 450, in other embodiments the routine may operate in an asynchronous manner such that other operations are performed (e.g., corresponding to handling another set of instructions or information that are received in block 405, such as from a different user or other entity) while waiting for a response from block 450, and that the operations of block 450 may be performed in a substantially immediate manner (e.g., in a real-time or near-real-time manner, such as a fraction of a second, a second, less than 10 seconds, etc.) in at least some embodiments.

In block 485, the routine proceeds to perform one or more other indicated operations as appropriate, with non-exclusive examples of such other operations including retrieving and providing previously determined or generated information (e.g., previous user queries, previously determined responses to user queries, previously summarized and encoded content for one or more target domains, etc.), receiving and storing information for later use (e.g., information about one or more target domains, such as some or all of a corpus of documents for the domain, domain-specific token embeddings for the domain, domain-specific labeled content groups for the domain, etc.), providing information about how one or more previous query responses were determined, performing housekeeping operations, etc.

After blocks 480 or 485, the routine continues to block 495 to determine whether to continue, such as until an explicit indication to terminate is received (or alternatively only if an explicit indication to continue is received). If it is determined to continue, the routine returns to block 405 to await further information or instructions, and if not continues to block 499 and ends.

Figure 5:
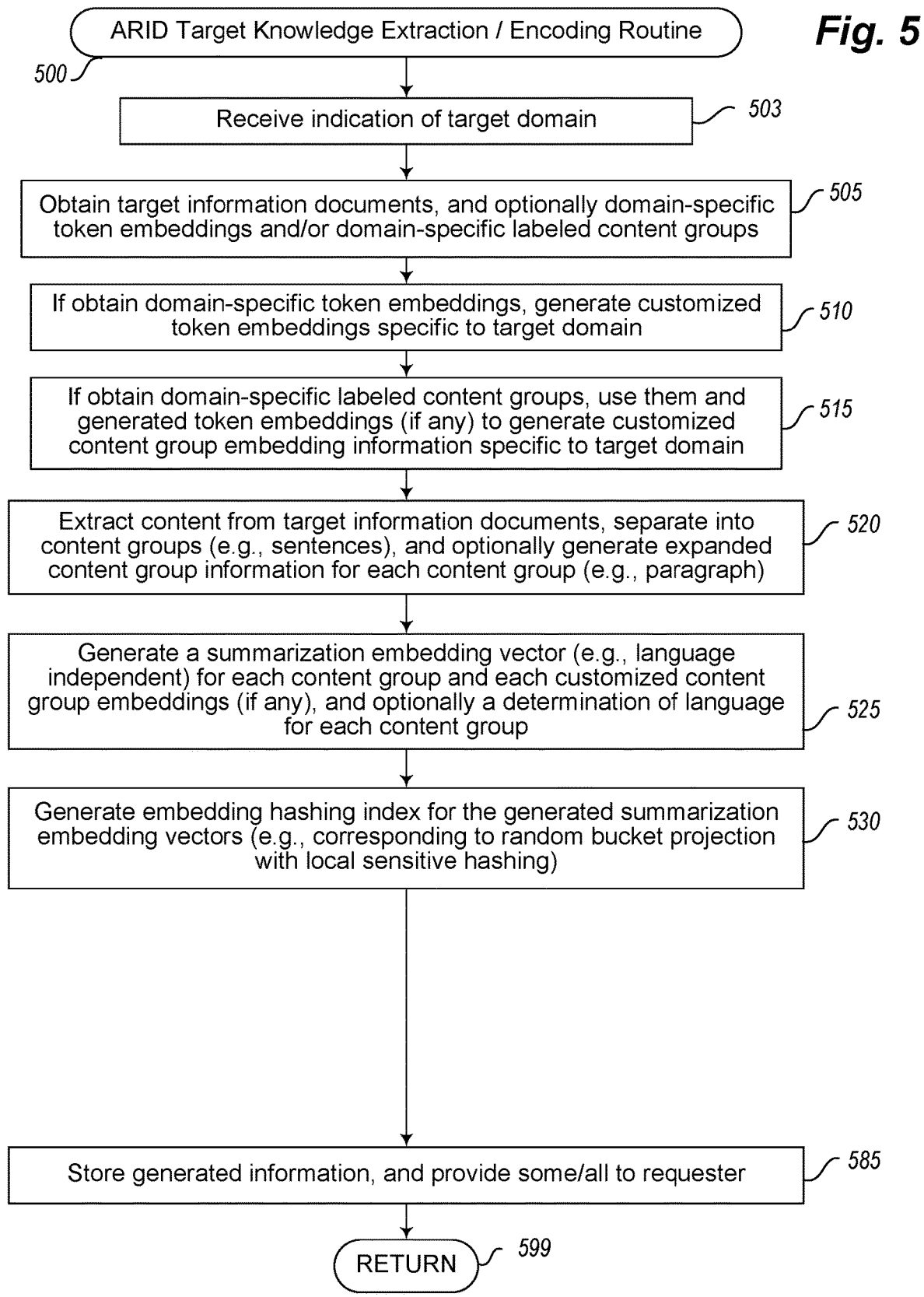
FIG. 5 illustrates a flow diagram of an example embodiment of an ARID Target Knowledge Extraction/Encoding component routine.

FIG. 5 is a flow diagram of an example embodiment of an ARID Target Knowledge Extraction/Encoding routine 500. The routine may be provided by, for example, execution of the ARID Knowledge Extraction/Encoding component 142 of FIGS. 1A-11B and/or a corresponding component (not shown) of the ARID system 340 of FIG. 3 and/or with respect to corresponding functionality discussed with respect to FIGS. 2A-2D and elsewhere herein, such as to summarize and encode information from an indicated target domain. In addition, in at least some situations, the routine 500 may be performed based on execution of block 425 of FIG. 4, with resulting information provided and execution control returning to that location when the routine 500 ends. In this example, the routine 500 is performed with respect to an initial analysis of domain-specific content for a target domain (e.g., medical guidelines and optionally other associated health-related information for one or more medical areas), but in other embodiments may be similarly performed to update previously analyzed information, such as to analyze additional documents that become available for a domain after a prior analysis of other documents and use of resulting information has been completed. Furthermore, in a manner similar to that of the other routines, the routine 500 may determine domain-specific information in advance of the use of that determined information, and/or dynamically in response to a request for such information.

The illustrated embodiment of the routine 500 begins at block 503, where an indication of a target domain is received, or alternatively receives some or all of documents with information for that target domain. In block 505, the routine then obtains documents with information about the target domain and optionally additional domain-specific information (e.g., domain-specific token embeddings, domain-specific labeled content groups, etc.), such as by using currently provided information about that domain information, using previously stored domain information and/or information about a location of such domain information, by searching for or otherwise dynamically identifying corresponding domain information, etc. In block 510, the routine then, if domain-specific token embedding information is obtained in block 505, generates customized token embeddings specific to the target domain. Similarly, in block 515 the routine then, if domain-specific labeled content group information is obtained in block 505, uses them and generated token embedding information from block 510 (if any) to generate customized content group embedding information that is specific to the target domain. In block 520, the routine then extracts the content from the target information documents and separates the content into multiple content groups (e.g., sentences), and optionally generates expanded content group information (e.g., a corresponding paragraph) for each content group.

In block 525, the routine then uses the information from blocks 505-520 to generate a summarization embedding vector for each content group (e.g., in a language-independent manner), including using customized content group embeddings from block 515 if available, and optionally generates a language determination for each content group. In block 530, the routine then generates embedding hashing information for the generated summarization embedding vectors, such as a hash number or other hash representation for each summarization embedding vector that is used to group together similar embedding vectors with similar hash numbers/representations (e.g., into multiple buckets, such as by using random bucket projection with local sensitive hashing).

After block 530, the routine continues to block 585 to store the generated information for later use, and to optionally provide some or all of the generated information to the requester that initiated invocation of the routine 500. After block 585, the routine continues to block 599 and ends.

Figure 6:
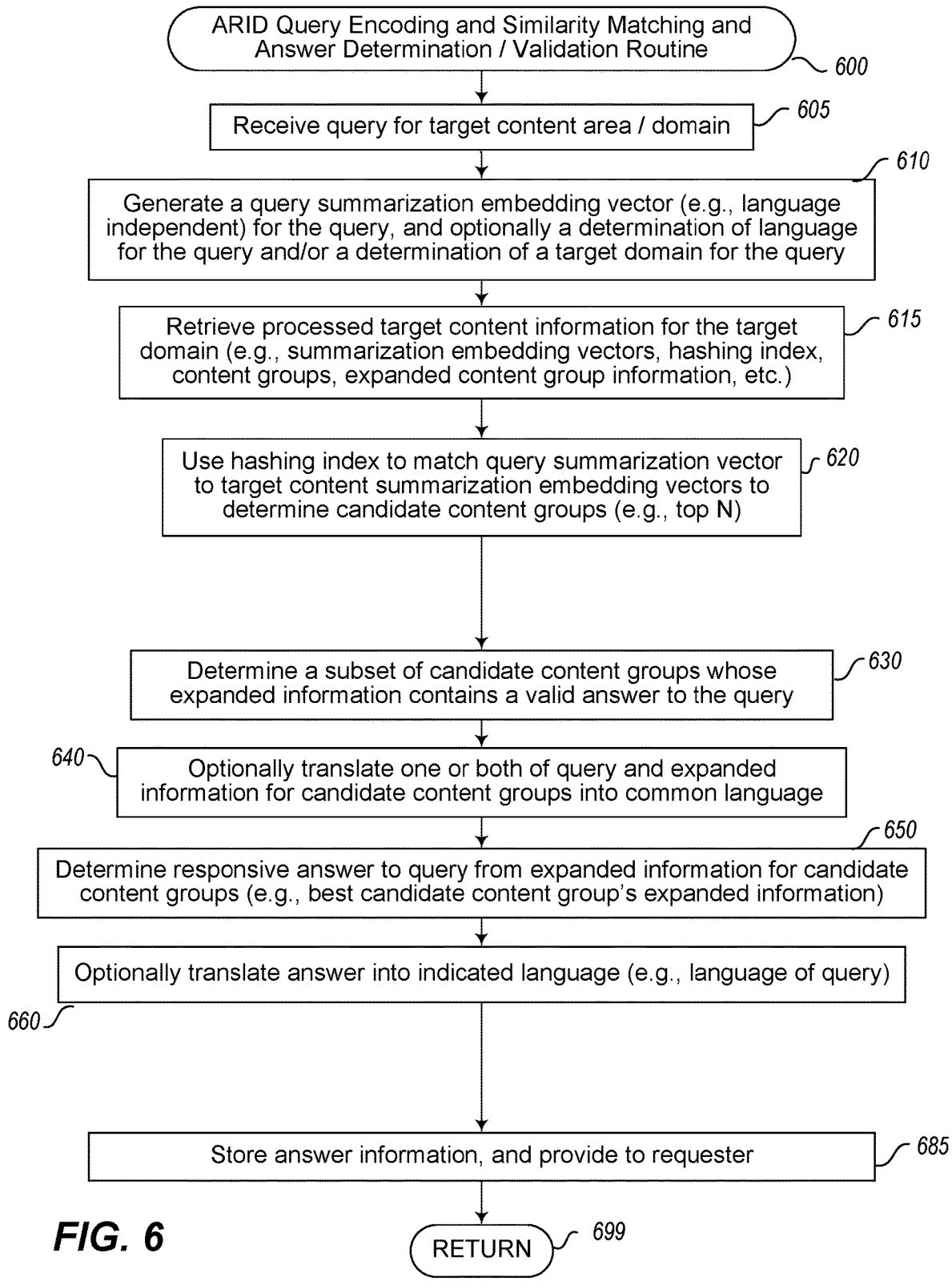
FIG. 6 illustrates a flow diagram of an example embodiment of an ARID Query Encoding and Similarity Matching and Answer Determination/Validation component routine.

FIG. 6 is a flow diagram of an example embodiment of an ARID Query Encoding and Similarity Matching and Answer Determination/Validation routine 600. The routine may be provided by, for example, execution of the ARID Query Encoding component 144 and ARID Similarity Matching component 146 and ARID Answer Determination/Validation component 148 of FIGS. 1A-1B and/or of one or more corresponding components (not shown) of the ARID system 340 of FIG. 3 and/or with respect to corresponding functionality discussed with respect to FIGS. 2A-2D and elsewhere herein, such as to respond to a received query for a target domain by determining a responsive answer to the query using summarized and encoded information about the target domain. The routine 600 may be initiated by, for example, execution of block 450 of FIG. 4, with resulting information provided and execution control returning to that location when the routine 600 ends. In addition, in a manner similar to that of the other routines, the routine 600 may dynamically determine and provide responses to received queries in the illustrated embodiment, but in other embodiments may determine and store responses to some or all queries for some or all domains in advance of receiving corresponding new user queries (e.g., based on instructions received from a human operator of the ARID system, based on previous queries by other users, etc.) and use such stored responses when such new queries are received. In addition, in the illustrated embodiment, the determination of encoded domain information in FIG. 5 is illustrated as being performed separately from the use of such information in FIG. 6, although in other embodiments such activities may be performed in other manners, including to dynamically perform some or all of the activities of FIGS. 5 and 6 in response to a received user query or other corresponding instruction.

The illustrated embodiment of the routine 600 begins in block 605, where a query is received corresponding to a target domain or other target content area. In block 610, the routine then generates a query summarization embedding vector for the query (e.g., in a language-independent manner), optionally determines the language for the query, and determines a target domain to use for the query if not indicated in the information received in block 605 (e.g., based on an analysis of the content of the query), although in other embodiments such a query may instead be compared to information for multiple domains (e.g., all domains for which encoded information is available). In block 615, the routine then retrieves processed and encoded information for the target domain (e.g., summarization embedding vectors, hashing index information, content groups and expanded content group information, etc.), although in other embodiments may instead dynamically generate such information (e.g., if the user query corresponds to a new target domain for which previously stored information is not available, if updates to the underlying information for the target domain are available but not yet analyzed, etc.). In block 620, the routine then generates hashing information for the query summarization embedding vector, and uses that hashing information to match the query summarization vector to multiple similar target content summarization embedding vectors (e.g., a top N quantity of vectors) for use as candidates for having their associated content groups and expanded content group information be used to provide a responsive answer to the query.

In block 630, the routine then determines a subset of the candidate content groups for the candidate embedding vectors whose expanded content information is found to contain a possible answer to the query, such as by using a validation model that makes that determination without identifying the actual answer in the candidate expanded content information (or corresponding candidate content group). In block 640, the routine then optionally translates one or both of the query and the expanded information for one or more of the candidate content groups into a common language, such as if the multiple candidate content groups and their expanded information are in different languages and/or if the query is in a different language from one or more of the candidate content groups and their expanded information. In block 650, the routine then determines a responsive answer to the query from the expanded information for the candidate content groups that have been validated as containing a valid answer, such as to select and analyze the candidate content group and expanded information that is determined to best match the query. In block 660, the routine then optionally translates the determined responsive answer into an indicated language, such as the language of the query if the determined responsive answer is in a different language.

After block 660, the routine continues to block 685 to store the determined responsive answer information for later use, and to provide that determined information to the requester that initiated invocation of the routine 600. After block 685, the routine continues to block 699 and ends.

Figure 7:
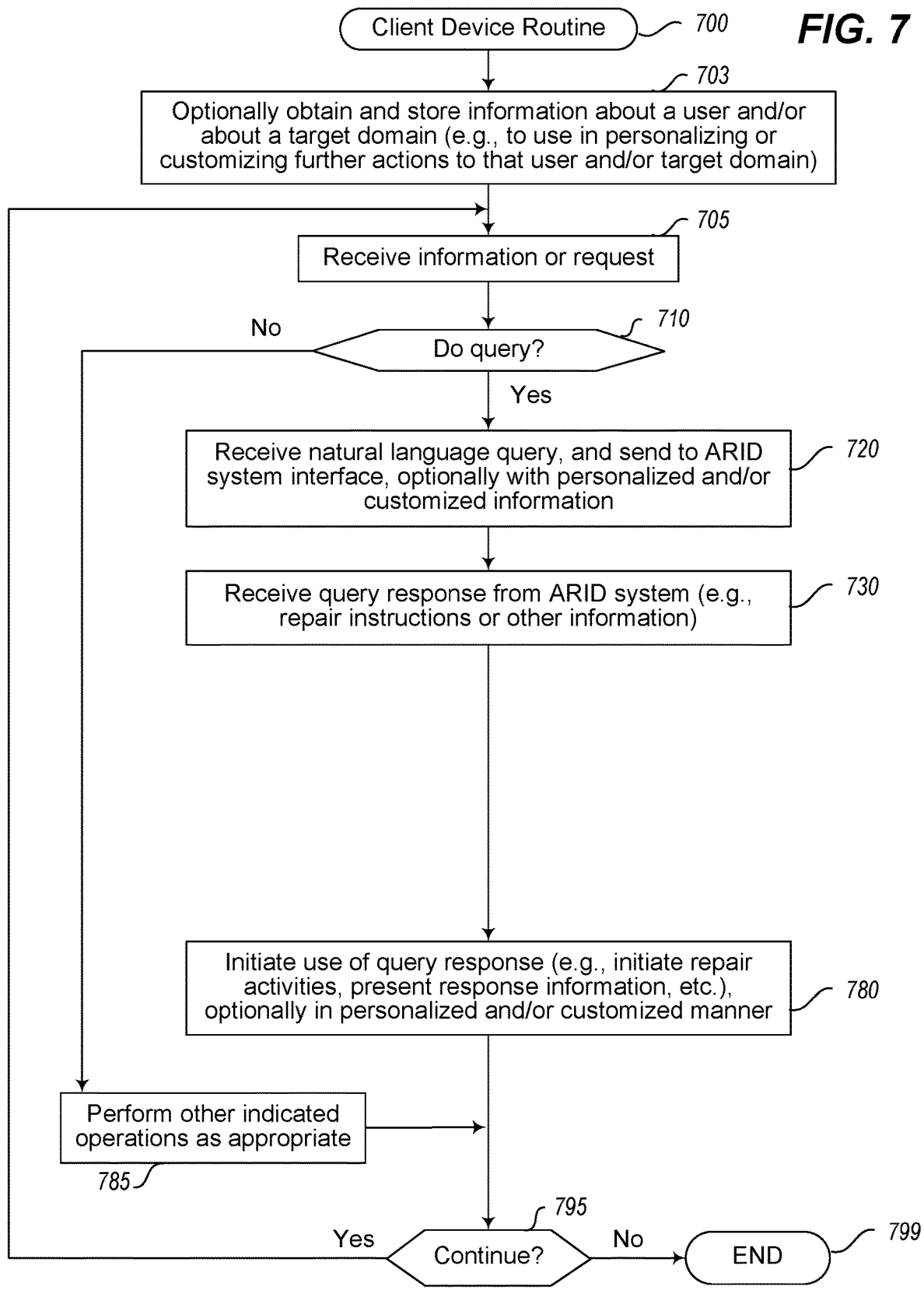
FIG. 7 illustrates a flow diagram of an example embodiment of a client device routine.

FIG. 7 is a flow diagram of an example embodiment of a client device routine 700. The routine may be provided by, for example, operations of a client computing device 110 of FIGS. 1A-1B and/or a client computing device 360 of FIG. 3 and/or with respect to corresponding functionality discussed with respect to FIGS. 2A-2D and elsewhere herein, such as to interact with users or other entities who submit queries (or other information) to the ARID system, to receive responsive answers (or other information) from the ARID system, and to use the received information in one or more manners (e.g., to automatically implement repair or maintenance activities in accordance with a received responsive answer that includes corresponding executable instructions; to otherwise assist in initiating repair or maintenance activities in accordance with a received responsive answer that includes corresponding information, such as by displaying or otherwise presenting at least some such information to one or more users to enable them to perform at least some of the corresponding activities; to otherwise assist in providing information from the determined responsive answer to one or more users or other requesting entities; etc.).

The illustrated embodiment of the routine 700 begins at block 703, where information is optionally obtained and stored about the user and/or about a target domain, such as for later use in personalizing or otherwise customizing further actions to that user and/or that target domain. The routine then continues to block 705, where information or a request is received. In block 710, the routine determines if the information or request received in block 705 is to perform a query, and if not continues to block 785. Otherwise, the routine continues to block 720, where it receives the query in a natural language format (e.g., free form text), and sends a query to the ARID system interface to obtain a corresponding responsive answer, optionally after personalizing and/or customizing the information to be provided to the ARID system (e.g., to add information specific to the user, such as location, demographic information, preference information, etc.; to add an indication of one or more specific target domains to use; etc.). In block 730, the routine then receives a responsive answer to the query from the ARID system, such as to include repair and/or maintenance instructions or other information. In block 780, the routine then initiates use of the received query response information, such as to initiate automated repair activities, to display or otherwise present response information to the user, etc., including to optionally perform such use in a personalized and/or customized manner (e.g., to perform a display or other presentation in accordance with preference information for the user, to select a type of action to take based on information specific to the user, etc.). It will be appreciated that, while the routine indicates proceeding to block 730 immediately after block 725, in other embodiments the routine may operate in an asynchronous manner such that other operations are performed (e.g., corresponding to handling another set of instructions or information that are received in block 705, such as from a different user or other entity) while waiting for a response from block 725, and that the operations of block 725 may be performed in a substantially immediate manner (e.g., less than one second, less than 10 seconds, less than one minute, etc.) in at least some embodiments.

In block 785, the routine instead performs one or more other indicated operations as appropriate, with non-exclusive examples including sending information to the ARID system of other types (e.g., instructions about a new target domain for which to summarize and encode information before corresponding user queries are received, information to be processed for an indicated target domain, etc.), receiving and responding to requests for information about previous user queries and/or corresponding responsive answers for a current user and/or client device, receiving and store information for later use in personalization and/or customization activities, receiving and responding to indications of one or more housekeeping activities to perform, etc.

After blocks 780 or 785, the routine continues to block 795 to determine whether to continue, such as until an explicit indication to terminate is received (or alternatively only if an explicit indication to continue is received). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:
    encoding, by one or more computing systems, information from multiple documents about how to perform a plurality of types of repairs for one or more indicated device types, wherein the multiple documents include repair manuals for the one or more indicated device types, and wherein the encoding includes:
        separating, by the one or more computing systems and for each of the multiple documents, content from that document into multiple content groups that are each a subset of that content;
        generating, by the one or more computing systems, a plurality of content embedding vectors to represent the information from the multiple documents, including generating, for each of the multiple content groups of each of the multiple documents, one of the plurality of content embedding vectors to represent semantic information of that content group;
        generating, by the one or more computing systems, hashing information for the plurality of content embedding vectors, including generating a separate hash number for each of the plurality of content embedding vectors, and grouping the plurality of content embedding vectors into multiple buckets, wherein each bucket is associated with a group of multiple hash numbers and has a subset of multiple of the plurality of content embedding vectors whose hash numbers are in the associated group for the bucket; and
        generating, by the one or more computing systems and for each of the multiple content groups, expanded content for that content group that includes that content group and additional information from the content of the document from which that content group was separated;
    encoding, by the one or more computing systems, a received query about performing an indicated type of repair for an indicated device of one of the one or more indicated device types, wherein the received query is provided in a natural language format, and wherein the encoding of the received query includes generating a query embedding vector that represents semantic information of the received query;
    determining, by the one or more computing systems, a response to the received query that provides instructions for performing the indicated type of repair for the indicated device, including:
        matching, by the one or more computing systems, the query embedding vector to a group of multiple candidate content embedding vectors, including identifying one of the multiple buckets whose associated group of multiple hash numbers includes an additional hash number generated for the query embedding vector, and wherein the multiple candidate content embedding vectors are a subset of the plurality of content embedding vectors and include at least some of the multiple content embedding vectors of the identified one bucket that each has a matching distance to the query embedding vector below a defined threshold;

validating, by the one or more computing systems, and for each of one or more identified candidate content embedding vectors from the group of multiple candidate content embedding vectors, that the expanded content for the content group represented by that identified candidate content embedding vector provides the instructions for performing the indicated type of repair for the indicated device; and generating, by the one or more computing systems, the instructions for performing the indicated type of repair for the indicated device from the expanded content for the content group represented by a selected one of the one or more identified candidate content embedding vectors; and providing, by the one or more computing systems, the determined response to the received query, to initiate performing the indicated type of repair for the indicated device.

2. The computer-implemented method of claim 1 wherein the determining of the response to the received query includes determining, by the one or more computing systems, executable instructions to automatically implement the indicated type of repair for the indicated device, and wherein the providing of the determined response includes transmitting the executable instructions to the indicated device and initiating execution of the executable instructions on the indicated device to cause automatic implementation of the indicated type of repair for the indicated device.

3. A computer-implemented method comprising:

encoding, by one or more computing systems, information from multiple documents about how to perform a plurality of types of at least one of repair actions or maintenance actions in a target area, including:

separating, by the one or more computing systems and for each of the multiple documents, content from that document into multiple content groups that are each a subset of that content, and associating, for each of the multiple content groups, additional information with that content group to provide expanded content for that content group; and generating, by the one or more computing systems, a plurality of content embedding vectors to represent the information from the multiple documents, including generating, for each of the multiple content groups of each of the multiple documents, one of the plurality of content embedding vectors to represent semantic information of that content group;

encoding, by the one or more computing systems, a received query about an indicated type of the at least one of repair actions or maintenance actions in the target area, wherein the received query is provided in a natural language format, and wherein the encoding of the received query includes generating a query embedding vector that represents semantic information of the received query;

determining, by the one or more computing systems, a response to the received query that provides instructions for the indicated type of the at least one of repair actions or maintenance actions, including:

matching, by the one or more computing systems, the query embedding vector to a group of multiple candidate content embedding vectors, wherein the multiple candidate content embedding vectors are a subset of the plurality of content embedding vectors and each has a matching distance to the query embedding vector below a defined threshold;

validating, by the one or more computing systems, and for each of one or more identified candidate content embedding vectors from the group of multiple candidate content embedding vectors, that a combination of content from information of the content group represented by that identified candidate content embedding vector and the expanded content for that content group provides the instructions for the indicated type of the at least one of repair actions or maintenance actions; and generating, by the one or more computing systems, the instructions for the indicated type of the at least one of repair actions or maintenance actions from the combination of content for at least one of the one or more identified candidate content embedding vectors; and providing, by the one or more computing systems, the determined response to the received query, to initiate the indicated type of the at least one of the repair actions or maintenance actions.

4. The computer-implemented method of claim 3 wherein the indicated type of the at least one of repair actions or maintenance actions in the target area is an indicated type of repair for an indicated device, wherein the determining of the response to the received query includes determining, by the one or more computing systems, executable instructions to automatically implement the indicated type of repair for the indicated device, and wherein the providing of the determined response includes initiating execution of the executable instructions to cause automatic implementation of the indicated type of repair for the indicated device.

5. The computer-implemented method of claim 3 wherein each of the content groups is a sentence, wherein the additional information associated with a content group is at least some of a paragraph including the sentence for that content group, wherein the generating of the content embedding vector for each of the content groups includes supplying that content group to a first neural network trained to predict one or more words associated with words in the sentence for that content group, and wherein the validating for each of the one or more identified candidate content embedding vectors includes using a second neural network that is based on a language model and is improved by replacing a top layer of the second neural network with substitute inter-connected neural network nodes trained to solve entailment tasks.

6. A non-transitory computer-readable medium having stored contents that cause one or more computing systems to perform automated operations, the automated operations including at least:

obtaining, by the one or more computing systems, encoded information about how to perform a plurality of types of actions in a target area, wherein the encoded information includes a plurality of content embedding vectors with, for each of multiple content groups in the target area, one of the plurality of content embedding vectors to represent semantic information of that content group;

encoding, by the one or more computing systems, a received query that is about an indicated type of action in the target area and is provided in a natural language format, including generating a query embedding vector that represents semantic information of the received query;

determining, by the one or more computing systems, a response to the received query that provides information about the indicated type of action, including validating, for each of one or more candidate content embedding vectors that are identified from the plurality of content embedding vectors based at least in part on each matching the query embedding vector, that the sematic information of the content group represented by that candidate content embedding vector provides at least some of the information about the indicated type of action, and obtaining the information about the indicated type of action by, for at least one of the one or more candidate content embedding vectors, using information of at least one content group represented by the at least one candidate content embedding vector; and providing, by the one or more computing systems, the determined response to the received query including the information about the indicated type of action, to initiate implementation of the indicated type of action.

7. The non-transitory computer-readable medium of claim 6 wherein the obtaining of the encoded information about how to perform the plurality of types of actions includes:

separating, by the one or more computing systems, content from multiple documents into the multiple content groups, wherein each of the multiple content groups is a subset of contents of one of the multiple documents; and generating, by the one or more computing systems, the plurality of content embedding vectors to represent sematic information of the multiple content groups, and wherein the non-transitory computer-readable medium includes a memory of at least one of the one or more computing systems and the stored contents are instructions that, when executed, program the one or more computing systems to perform further automated operations including at least:

associating, by the one or more computing systems and for each of the multiple content groups, additional information with that content group to provide expanded content for that content group, the additional information including an additional subset of the contents of the one document from which that content group is a subset;

performing, by the one or more computing systems, the validating to, for each of one or more identified candidate content embedding vectors, determine that a combination of the sematic information of the content group represented by that identified candidate content embedding vector and the additional information for that content group provides the information about the indicated type of action; and performing, by the one or more computing systems, the obtaining of the information about the indicated type of action by, for one of the one or more identified candidate content embedding vectors, extracting that information from the combination of the sematic information of the content group represented by the one identified candidate content embedding vector and the additional information for that content group.

8. The non-transitory computer-readable medium of claim 7 wherein each of the content groups is a sentence, wherein the additional information associated with a content group is at least some of a paragraph including the sentence for that content group, wherein the provided information about the indicated type of action includes instructions for performing the indicated type of action, and wherein identifying of the one or more candidate content embedding vectors that match the query embedding vector includes determining, by the one or more computing systems and for each of the one or more candidate content embedding vectors, that the candidate content embedding vector has a degree of matching to the query embedding vector that exceeds a defined threshold.

9. The non-transitory computer-readable medium of claim 6 wherein the stored contents include software instructions that, when executed, cause the one or more computing systems to perform further automated operations that include generating the plurality of content embedding vectors by, for each of the content embedding vectors, supplying the content group whose semantic information is represented by that content embedding vector to a first neural network trained to predict one or more words associated with words in the sentence for that content group, and wherein the validating for each of the one or more identified candidate content embedding vectors includes using a second neural network that is based on a language model and is improved by replacing a top layer of the second neural network with substitute inter-connected neural network nodes trained to solve entailment tasks.

10. A system, comprising:
one or more hardware processors of one or more computing systems; and
one or more memories with stored instructions that, when executed by at least one of the one or more hardware processors, cause the one or more computing systems to perform automated operations including at least:

obtaining encoded information about how to perform a plurality of types of actions involving at least one of treating or preventing problems in a target area, wherein the encoded information includes a plurality of content embedding vectors with, for each of multiple content groups related to the target area, one of the plurality of content embedding vectors to represent semantic information of that content group;

encoding a received query that is about an indicated problem in the target area and is provided in a natural language format, and wherein the encoding of the received query includes generating a query embedding vector that represents semantic information of the received query;

determining a response to the received query that provides information about at least one of treating or preventing the indicated problem, including validating, for each of one or more candidate content embedding vectors that are identified from the plurality of content embedding vectors and that each matches the query embedding vector, that information of the content group represented by that candidate content embedding vector provides at least some of the information about the at least one of the treating or the preventing of the indicated problem, and obtaining the information about the at least one of the treating or the preventing of the indicated problem by, for at least one of the one or more candidate content embedding vectors, using the information in at least one content group represented by the at least one candidate content embedding vector; and providing the determined response to the received query including the information about the at least one of treating or preventing the indicated problem, to initiate the at least one of the treating or the preventing of the indicated problem.

11. The system of claim 10 wherein the obtaining of the encoded information about how to perform the plurality of types of actions includes:

separating content from multiple documents into the multiple content groups, wherein each of the multiple content groups is a subset of contents of one of the multiple documents; and generating the plurality of content embedding vectors to represent sematic information of the multiple content groups, and wherein the stored instructions are software instructions that, when executed, program the one or more computing systems to perform further automated operations including at least:

associating, for each of the multiple content groups, additional information with that content group to provide expanded content for that content group, the additional information including an additional subset of the contents of the one document from which that content group is a subset;

performing the validating to, for each of one or more identified candidate content embedding vectors, determine that a combination of the sematic information of the content group represented by that identified candidate content embedding vector and the additional information for that content group provides the information about the at least one of the treating or the preventing of the indicated problem; and performing the obtaining of the information about the at least one of the treating or the preventing of the indicated problem by, for one of the one or more identified candidate content embedding vectors, extracting that information from the combination of the sematic information of the content group represented by the one identified candidate content embedding vector and the additional information for that content group.

12. The system of claim 11 wherein each of the content groups is a sentence, wherein the additional information associated with a content group is at least some of a paragraph including the sentence for that content group, wherein the provided information about the at least one of the treating or the preventing of the indicated problem includes instructions for performing the at least one of the treating or the preventing, and wherein identifying of the one or more candidate content embedding vectors that match the query embedding vector includes determining, for each of the one or more candidate content embedding vectors, that the candidate content embedding vector has a degree of matching to the query embedding vector that exceeds a defined threshold.

13. The system of claim 10 wherein the plurality of types of actions include at least one of treating or preventing problems for one or more types of computing devices by performing at least one of repair actions or maintenance actions, and wherein the multiple content groups are each a subset of a document with at least one of repair information or maintenance information for at least one of the one or more types of computing devices.

14. The system of claim 13 wherein the received query is about obtaining a solution to the indicated problem for an indicated device of the one or more types of computing devices, wherein the determining of the response to the received query includes determining executable instructions to automatically implement the solution to the indicated problem on the indicated device, and wherein the providing of the determined response includes initiating execution of the executable instructions to cause automatic implementation of the solution to the indicated problem on the indicated device.

15. The system of claim 10 wherein the plurality of types of actions include actions to at least one of treat or prevent multiple problems that include at least one of indicated conditions or indicated symptoms, and wherein the multiple content groups are each a subset of a document with at least one of treatment information or prevention information for at least one of the multiple problems.

16. The system of claim 15 wherein the received query is about at least one of treating or preventing an indicated medical problem, wherein the at least one of the indicated conditions or indicated symptoms include at least one of an indicated medical condition or an indicated medical symptom, wherein the multiple content groups include information from medical clinical guidelines, and wherein the providing of the determined response includes providing information to initiate at least one of treatment actions or prevention actions for the indicated medical problem.

17. The system of claim 10 wherein the automated operations further include generating the plurality of content embedding vectors by, for each of the content embedding vectors and with respect to the content group whose sematic information is represented by that content embedding vector, supplying that content group to a first neural network trained to predict one or more words associated with words in the sentence for that content group, and wherein the validating for each of the one or more identified candidate content embedding vectors includes using a second neural network that is based on a language model and is improved by replacing a top layer of the second neural network with substitute inter-connected neural network nodes trained to solve entailment tasks.

18. The system of claim 10 wherein each of the multiple content groups is a sentence, wherein the obtaining of the encoded information about how to perform the plurality of types of actions includes generating the plurality of content embedding vectors from the multiple content groups, and wherein each of the plurality of content embedding vectors is a vector of multiple float numbers that is generated and organized such that sentences with similar meanings have similar content embedding vectors.

19. The system of claim 10 wherein the obtaining of the encoded information about how to perform the plurality of types of actions includes generating the plurality of content embedding vectors and further includes generating hashing information for the plurality of content embedding vectors that includes a separate hash representation for each of the plurality of content embedding vectors, wherein the encoding of the received query includes generating an additional hash representation for the query embedding vector, and wherein the determining of the response to the received query includes identifying the one or more candidate content embedding vectors based at least in part on the separate hash representation of each of the one or more candidate content embedding vectors being within a distance threshold of the additional hash representation for the query embedding vector.

20. The system of claim 19 wherein the obtaining of the encoded information about how to perform the plurality of types of actions further includes grouping the plurality of content embedding vectors into multiple buckets, wherein each bucket is associated with a group of multiple hash representations and has a subset of multiple of the plurality of content embedding vectors whose hash representations are in the associated group for the bucket, and wherein the identifying of the one or more candidate content embedding vectors based at least in part on the separate hash representation of each of the one or more candidate content embedding vectors being within a distance threshold of the additional hash representation for the query embedding vector includes identifying one of the multiple buckets whose associated group of multiple hash representations includes the additional hash representation for the query embedding vector, and identifying at least some of the one or more candidate content embedding vectors from a subset of the multiple content embedding vectors of the identified one bucket that each has a matching distance to the query embedding vector below a defined threshold.

21. The system of claim 10 wherein the validating, for each of the one or more candidate content embedding vectors, that the information of the content group represented by that candidate content embedding vector provides at least some of the information about the at least one of the treating or the preventing of the indicated problem includes determining that a trained entailment model for the target area indicates that the information of the content group represented by that candidate content embedding vector includes the information about the at least one of the treating or the preventing of the indicated problem.

22. The system of claim 10 wherein the obtaining of the encoded information about how to perform the plurality of types of actions includes generating the plurality of content embedding vectors and further includes identifying information about multiple entities of multiple types in the multiple content groups, wherein the encoding of the received query includes identifying one of the multiple entities in the received query, and wherein the determining of the response includes gathering information about the identified one entity in the information in the at least one content group represented by the at least one candidate content embedding vector, and including the gathered information as part of the provided information about the at least one of treating or preventing the indicated problem.

23. The system of claim 10 wherein multiple languages are used to represent the received query and the multiple content groups, wherein the query embedding vector and the plurality of content embedding vectors are encoded in a language-independent manner, and wherein the determining of the response to the received query includes automatically translating at least one of the received query or the provided information about the at least one of treating or preventing the indicated problem into a different language.

24. The system of claim 10 wherein the multiple content groups are each extracted subset from one of multiple documents, and wherein the determining of the response includes gathering, from one of the multiple documents from which the at least one content group represented by the at least one candidate content embedding vector is extracted, non-textual information associated with the at least one content group, and including the gathered non-textual information as part of the provided information about the at least one of treating or preventing the indicated problem.

25. The system of claim 10 wherein the obtaining of the encoded information about how to perform the plurality of types of actions includes receiving contents of multiple documents related to the target area, and extracting, from the contents of each of the multiple documents, some of the multiple content groups, and generating the plurality of content embedding vectors from the multiple content groups, and wherein the automated operations further include, after the providing of the determined response to the received query:

obtaining additional contents of one or more additional documents related to the target area;

extracting, from the additional contents, multiple additional content groups;

generating multiple additional content embedding vectors from the multiple additional content groups;

encoding an additional received query about an additional indicated problem in the target area, including generating an additional query embedding vector that represents semantic information of the additional received query;

determining an additional response to the additional received query by using the plurality of content embedding vectors and the multiple additional content embedding vectors, including validating, for each of multiple additional candidate content embedding vectors that each matches the additional query embedding vector and that include at least one of the multiple additional content embedding vectors and at least one of the plurality of content embedding vectors, that the sematic information of the content group represented by that candidate content embedding vector provides at least some information about the additional indicated problem, and obtaining information to be provided about the additional indicated problem for the determined additional response by, for at least one of the one or more candidate content embedding vectors that includes one of the multiple additional content embedding vectors, using information in at least one content group represented by the at least one candidate content embedding vector; and providing the determined additional response to the additional received query including the information to be provided about the additional indicated problem.

* * * * *